US010169276B2

(12) United States Patent
Lu et al.

(10) Patent No.: US 10,169,276 B2
(45) Date of Patent: Jan. 1, 2019

(54) DETECTING A COMMUNICATION MODE VIA INTERRUPTIONS

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 302 days.

(21) Appl. No.: 14/913,888

(22) PCT Filed: Aug. 22, 2014

(86) PCT No.: PCT/CN2014/084968
§ 371 (c)(1),
(2) Date: Feb. 23, 2016

(87) PCT Pub. No.: WO2015/074448
PCT Pub. Date: May 28, 2015

(65) Prior Publication Data
US 2016/0357692 A1  Dec. 8, 2016

(30) Foreign Application Priority Data
Nov. 20, 2013  (CN) .......................... 2013 1 0585970

(51) Int. Cl.
G06F 13/38       (2006.01)
G06F 13/24       (2006.01)
(Continued)

(52) U.S. Cl.
CPC ........... G06F 13/385 (2013.01); G06F 13/24 (2013.01); G06F 13/4081 (2013.01); G06F 13/4282 (2013.01); G06F 2213/0042 (2013.01)

(58) Field of Classification Search
None
See application file for complete search history.

(56) References Cited

U.S. PATENT DOCUMENTS 6,769,622 B1 * 8/2004 Tournemille ........ G06F 17/5022
235/492
7,108,560 B1 * 9/2006 Chou ............... G06K 19/07732
439/660
(Continued)

FOREIGN PATENT DOCUMENTS

CN        102067097 A  *  5/2011  ......... G06F 13/4081
CN        103092802 A     5/2013
(Continued)

OTHER PUBLICATIONS

'An Embedded Converter from RS232 to Universal Serial Bus' by Zuquim et al., copyright 2001, IEEE.*
(Continued)

Primary Examiner — Steven G Snyder
(74) Attorney, Agent, or Firm — Ohlandt, Greeley, Ruggiero & Perle, LLP

(57) ABSTRACT

A method for a communication mode, comprises: detecting the type of the communication mode; if the communication mode is a USB interface communication mode, turning off a timer; when an instruction is received, conducting a corresponding operation according to the USB interface communication protocol supported by the device; if the communication mode is not set, then when the timeout identifier is set, setting the communication mode as a serial port communication mode, turning off the timer, resetting the timeout identifier, and executing step S6; if the communication mode is a serial port communication mode, turning off the timer, and executing step S6; step S6: when the instruction is received, conducting a corresponding operation according to the serial port protocol.

20 Claims, 11 Drawing Sheets

(51) Int. Cl.
*G06F 13/42* (2006.01)
*G06F 13/40* (2006.01)

(56) References Cited

U.S. PATENT DOCUMENTS

| | | | | |
|---|---|---|---|---|
| 7,398,336 | B2* | 7/2008 | Feng | G06F 13/4004 307/112 |
| 7,447,823 | B2* | 11/2008 | Ise | G06F 13/385 710/105 |
| 7,822,934 | B2* | 10/2010 | Morozumi | G06F 13/387 709/203 |
| 8,924,614 | B2* | 12/2014 | Fujii | G06F 13/24 710/260 |
| 9,183,168 | B2* | 11/2015 | Adrian | G06F 13/385 |
| 9,201,822 | B2* | 12/2015 | Fujii | G06F 13/24 |
| 2002/0049874 | A1* | 4/2002 | Kimura | G06F 13/24 710/261 |
| 2003/0005272 | A1* | 1/2003 | Nalawadi | G06F 13/385 713/1 |
| 2003/0051192 | A1 | 3/2003 | Pillay | |
| 2004/0153582 | A1* | 8/2004 | Oyama | G06F 1/10 710/15 |
| 2006/0190529 | A1* | 8/2006 | Morozumi | G06F 13/387 709/203 |
| 2007/0162666 | A1* | 7/2007 | Ise | G06F 13/385 710/62 |
| 2009/0327530 | A1* | 12/2009 | Youn | G06F 13/4081 710/14 |
| 2014/0244869 | A1* | 8/2014 | Adrian | G06F 13/385 710/106 |
| 2015/0046619 | A1* | 2/2015 | Fujii | G06F 13/24 710/267 |
| 2015/0347329 | A1 | 12/2015 | Lu et al. | |
| 2017/0139467 | A1* | 5/2017 | Waters | G06F 1/3287 |

FOREIGN PATENT DOCUMENTS

| | | | | |
|---|---|---|---|---|
| CN | 103207964 A | | 7/2013 | |
| CN | 103631747 | | 3/2014 | |
| CN | 107179999 A | * | 9/2017 | |
| JP | WO 2005003980 A1 | * | 1/2005 | G06F 13/387 |
| WO | WO 2010002118 A2 | * | 1/2010 | G06F 13/4081 |

OTHER PUBLICATIONS

'Device Class Definition for Human Interface Devices (HID)—Firmware Specification,' Version 1.11, Jun. 27, 2001.*
'Specification for Integrated Circuit(s) Cards Interface Devices' Revision 1.1, Apr. 22rd, 2005, pp. 1-3, full document at http://www.usb.org/developers/docs/devclass_docs/DWG_Smart-Card_CCID_Rev110.pdf.*
'Smart Card APDU Analysis' by Ivan Buetler, Black Hat Briefings, Compass Security AG, 2008.*
'What's the Difference Between USB UASP and BOT' by Dave Johnson, Mar. 18, 2012.*
'Universal Serial Bus Specification Revision 2.0' Apr. 27, 2000, pp. 48-52, 382-394. (Year: 2000).*
International Search Report dated Nov. 26, 2014 from corresponding International Application No. PCT/CN2014/084968; 9 pages.
Written Opinion dated Nov. 26, 2014 from corresponding International Application No. PCT/CN2014/084968; 14 pages.

* cited by examiner

DETECTING A COMMUNICATION MODE VIA INTERRUPTIONS

CROSS-REFERENCED APPLICATIONS

This application is the US national phase of International Application No. PCT/CN2014/084968, filed on Aug. 22, 2014, which claims the priority to Chinese Patent Application No. 201310585970.8, titled "RECOGNITION METHOD FOR COMMUNICATION MODE", filed on Nov. 20, 2013 with State Intellectual Property Office of People's Republic of China, which are incorporated herein by reference in their entireties.

BACKGROUND

1. Field of the Disclosure

The disclosure relates to the field of communication, in particular, to a method for recognizing a communication mode.

2. Discussion of the Background Art

With popularity of USB interfaces, a variety of USB devices are produced by manufacturers, which make the USB interfaces become one of essential interfaces of electronic products at present. Because the physical and mechanical properties of the USB interfaces are designed perfectly, a link layer of a USB interface is applied in a communication transfer of non-USB protocol, in other words, a USB interface is applied in transferring data flow of non-USB protocol. Thanks to the simple design and convenience of serial communication, products in which the link layer of a USB interface is applied in transferring serial data are becoming more and more popular. However, urgent issues are that how to make a device communicate not only by using a USB interface, but also by using a serial port on one hand, and how to determine a current communication mode on the other hand.

SUMMARY

The object of the present disclosure is to resolve the problem of the conventional technology by providing a method for recognizing a communication mode.

A technical solution provided by the present disclosure is a method for recognizing a communication mode, which includes:

step S1 including powering on a device, initializing, turning on an interruption and a timer, and the timer starting timing; entering a clock interruption when a preset value is reached by timing of the timer, wherein the clock interruption includes: turning off the timer, setting a time-out flag, turning on the timer, and exiting the clock interruption;

executing Step B1 to step B8 when other interruption signals are detected;

step B1 including determining a type of an interruption, executing step B2 in the case that the interruption is a USB interruption; executing step B6 in the case that the interruption is a serial port interruption;

step B2 including turning off the USB interruption;

step B3 including determining whether a communication mode is set, executing step B5 in the case that the communication mode is set; executing step B4 in the case that the communication mode is not set;

step B4 including setting the communication mode as USB interface communication, executing step B5;

step B5 including turning on the USB interruption, carrying out a USB enumeration, returning a USB interface communication protocol supported by the device to a host, exiting the USB interruption after the USB enumeration is finished;

step B6 including turning off the serial port interruption;

step B7 including determining whether the communication mode is set, turning on the serial port interruption and exiting the serial port interruption in the case that the communication mode is set; executing step B8 in the case that the communication mode is not set;

step B8 including setting the communication mode as serial communication according to a first data package which is received, turning on the serial port interruption, exiting the serial port interruption;

step S2 including detecting a type of the communication mode, turning off the timer and executing step S3 in the case that the communication mode is the USB interface communication; turning off the time and executing step S6 in the case that the communication mode is the serial communication; executing step S4 in the case that the communication mode is not set;

step S3 including waiting for an instruction sent by the host, when the instruction is received, processing an operation corresponding to the instruction according to the USB interface communication protocol supported by the device, and returning to step S3 after the operation is finished;

step S4 including determining whether the time-out flag is set, executing step S5 in the case that the time-out flag is set; returning to step S2 in the case that the time-out flag is not set;

step S5 including setting the communication mode as the serial communication, turning off the timer, resetting the time-out flag, executing step S6;

step S6 including waiting for an instruction sent by the host, when the instruction is received, processing an operation corresponding to the instruction according to a serial port protocol, and returning to step S6 after the operation is finished.

Optionally, the method further includes:
predefining, by the device, USB interface communication protocols supported by the device, wherein the protocols includes a CCID protocol, an HID protocol or an SCSI protocol;

returning the USB interface communication protocol supported by the device to the host in step B5 includes:
sending, by the device, a value of an IO communication identifier to the host.

Optionally, in the case that the value of the IO communication identifier is a first preset value, step S3 includes:
step S3-11 including waiting for an instruction sent by the host, when the instruction is received via a USB interface, storing the instruction in a first cache, parsing the instruction in the first cache according to the CCID protocol;

step S3-12 including determining data at a first byte in the parsed result, executing step S3-13 in the case that the data at the first byte is a first preset character; executing step S3-14 in the case that the data at the first byte is a second preset character; executing step S3-15 in the case that the data of the first byte are other values;

step S3-13 including carry out a corresponding process to the parsed result, storing a processed result into a second cache, returning the processed result to the host, returning to step S3-11;

step S3-14 including sending APDU data in the parsed result to a command layer to be processed, storing a processed result into the second cache when the processed result is received, returning the processed result to the host, returning to step S3-11;

step S3-15 including organizing an information error response and storing the information error response into the second cache, returning the information error response to the host, returning to step S3-11;

Optionally, in the case that the value of the IO communication identifier is a second preset value, step S3 includes:

step S3-21, including waiting for an instruction sent by the host, determining a state of a state machine when a Set up package of eight bytes is received via the USB interface, executing step S3-23 in the case that the state of the state machine is sending; executing step S3-22 in the case that the state of the state machine is receiving;

step S3-22 including parsing the Set up package according to the HID protocol, detecting data at the first two bytes of the parsed result, executing step S3-25 in the case that the data at the first two bytes of the parsed result is a first character string; returning to step S3-21 in the case that the data at the first two bytes are other values;

step S3-23 including parsing the Set up package according to the HID protocol, detecting data at the first two bytes of the parsed result, executing step S3-25 in the case that the data at the first two bytes of the parsed result is the first character string; executing step S3-24 in the case that the data at the first two bytes of the parsed result is a second character string; returning to step S3-21 in the case that the data at the first two bytes of the parsed result are other values;

step S3-24 including returning response data in the second cache to the host, setting the state of the state machine as receiving, returning to step S3-21;

step S3-25 including storing the parsed result of the Set up package into the first cache, determining whether the instruction is a hot reset instruction according to the parsed result, executing step S3-26 in the case that the instruction is a hot reset instruction; executing step S3-27 in the case that the instruction is not a hot reset instruction;

step S3-26 including setting a response data which includes a reset parameter, and storing the response data into the second cache, setting the state of the state machine as sending, returning to step S3-21;

step S3-27 including sending the parsed result to the command layer to be processed, receiving a processed result and storing the processed result into the second cache, setting the state of the state machine as sending, returning to step S3-21;

Optionally, in the case that the value of the IO communication identifier is a third preset value, step S3 includes:

step S3-31 including waiting for an instruction sent by the host, parsing the instruction according to the SCSI protocol when the instruction is received via the USB interface;

step S3-32 including determining whether the received instruction is a valid SCSI instruction in accordance with the parsed result, executing step S3-33 in the case that the instruction is a valid SCSI instruction; executing step S3-31 in the case that the instruction is not a valid SCSI instruction;

step S3-33 including determining whether the received instruction is a standard SCSI instruction in accordance with the parsed result, executing step S3-34 in the case that the received instruction is a standard SCSI instruction; executing step S3-35 in the case that the received instruction is not a standard SCSI instruction;

step S3-34 including carrying out a corresponding process according to the standard SCSI instruction, and returning a processed result to the host, returning to step S3-31;

step S3-35 including determining a state of data transfer, executing step S3-36 in the case that the state of data transfer is sending; executing step S3-37 in the case that the state of data transfer is receiving;

step S3-36 including returning response data in the second cache to the host, returning to step S3-31;

step S3-37 including storing the parsed result into the first cache, and determining whether the received instruction is a hot reset instruction according to the parsed result, executing step S3-38 in the case that the instruction is a hot reset instruction; executing step S3-39 in the case that the instruction is not a hot reset instruction;

step S3-38 including setting the response data which includes a reset parameter, and storing the response data into the second cache, setting the state of data transfer as sending, returning to step S3-31;

step S3-39 including sending the parsed result to the command layer to be processed, receiving a processed result and storing the processed result into the second cache, returning to step S3-31.

Optionally, the method further includes:

predefining, by the device, USB interface communication protocols supported by the device, wherein the USB interface communication protocols include at least two protocols of the CCID protocol, the HID protocol and the SCSI protocol;

wherein returning the USB interface communication protocol supported by the device to the host in step B5 includes: sending by the device, the IO communication identifier to the host.

Optionally, step S3 includes:

step S3-41 including, detecting a value of the IO communication identifier, executing step S3-42 in the case that the value of the IO communication identifier is a first preset value; executing step S3-47 in the case that the value of the IO communication identifier is a second preset value; executing step S3-54 in the case that the value of the IO communication identifier is a third preset value;

step S3-42 including waiting for an instruction sent by the host, storing the instruction into the first cache when the instruction is received via the USB interface, parsing the instruction in the first cache according to a CCID protocol;

step S3-43 including determining data at the first byte in a parsed result, executing step S3-44 in the case that the data at the first byte in the parsed result is a first preset character; executing step S3-45 in the case that the data at the first byte in the parsed result is a second preset character; executing step S3-46 in the case that the data at the first byte in the parsed result are other values;

step S3-44 including carrying out a corresponding process on the parsed result, storing a processed result into a second cache, returning the processed result to the host, returning to step S3-42;

step S3-45 including sending APDU data in the parsed result to a command layer to be processed, storing the parsed result into the second cache when the processed result is received, returning the processed result to the host, returning to step S3-42;

step S3-46 including organizing information error response and storing the information error response into the second cache, returning the information error response to the host, returning to step S3-42;

step S3-47 including waiting for an instruction sent by the host, determining a state of a state machine when a Set up package of eight bytes is received via the USB interface, executing step S3-49 in the case that the state of the state machine is sending; executing step S3-48 in the case that the state of the state machine is receiving;

step S3-48 including parsing the Set up package according to an HID protocol, detecting data at first two bytes in the parsed result, executing step S3-51 in the case that the data at the first two bytes is a first character string; returning to step S3-47 in the case that the data at the first two bytes in the parsed result are other values;

step S3-49 including paring the Set up package according to the HID protocol, detecting the data at the first two bytes in the parsed result, executing step S3-51 in the case that the data at the first two bytes in the parsed result is the first character string; executing step S3-50 in the case that the data at the first two bytes in the parsed result is a second character string; returning to step S3-47 in the case that the data at the first two bytes in the parsed result are other values;

step S3-50 including returning response data in the second cache to the host, setting the state of the state machine as receiving, returning to step S3-47;

step S3-51 including storing the parsed result of the Set up package into the first cache, determining whether the instruction is a hot reset instruction according to the parsed result, executing step S3-52 in the case that the instruction is a hot reset instruction; executing S3-53 in the case that the instruction is not a hot reset instruction;

step S3-52 including setting a response data which includes a reset parameter, storing the response into the second cache, setting the state of the state machine as sending, returning to step S3-47;

step S3-53 including sending the parsed result to a command layer to be processed, receiving a processed result and storing the processed result into the second cache, setting the state of the state machine as sending, returning to step S3-47;

step S3-54 including waiting for an instruction sent by the host, parsing the instruction according to the SCSI protocol when the instruction is received via the USB interface;

step S3-55 including determining whether the received instruction is a valid SCSI instruction according to the parsed result, executing step S3-56 in the case that the received instruction is a valid SCSI instruction; returning to step S3-54 in the case that the received instruction is not a valid SCSI instruction;

step S3-56 including determining whether the received instruction is a standard SCSI instruction in accordance with the parsed result, executing step S3-57 in the case that the instruction is a standard SCSI instruction; executing step S3-58 in the case that the instruction is not a standard SCSI instruction;

step S3-57 including carrying out a corresponding process in accordance with the standard SCSI instruction, returning a processed result to the host, returning to step S3-54;

step S3-58 including determining a state of data transfer, executing step S3-59 in the case that the state is sending; executing step S3-60 in the case that the state is receiving;

step S3-59 including returning response data in the second cache to the host, returning to step S3-54;

step S3-60 including storing the parsed result into the first cache, determining whether the received instruction is a hot reset instruction in accordance with the parsed result, executing step S3-61 in the case that the received instruction is a hot reset instruction; executing step S3-62 in the case that the received instruction is not a hot reset instruction;

step S3-61 including setting response data which includes a reset parameter, and storing the response data into the second cache, setting the state of data transfer as sending, returning to step S3-54;

step S3-62 including sending the parsed result to the command layer to be processed, receiving the processed result and storing the processed result into the second cache, returning to step S3-54.

Optionally, step S6 includes:

step S6-1 including when the instruction is received via a serial port, storing the instruction into a first cache, parsing the instruction stored in the first cache in accordance with the serial port protocol and determining whether data at the first byte of the parsed result is first preset data, executing step S6-2 in the case that the data is the first preset data; returning to step S6-1 in the case that the data is not the first preset data;

step S6-2 including determining whether data at a third byte in the parsed result is second preset data, executing step S6-3 in the case that the data is the second preset data; executing step S6-4 in the case that the data is not the second preset data;

step S6-3 including processing the parsed result and returning a processed result to the host, returning to step S6-1;

step S6-4 including detecting data at a fourth byte in the parsed result, executing step S6-5 in the case that the data is a third preset data; executing step S6-6 in the case that the data is a fourth preset data; returning to step S6-1 in the case that the data are other values;

step S6-5 including outputting low-battery information, entering a crash state, end;

step S6-6 including setting response data, and storing the response data into the second cache, returning to step S6-1;

wherein, the response data includes a communication baud rate between the device and the host and a length of transmitting data.

Optionally, the initialization includes:

setting a value of the communication identifier as 0;
detecting a type of the communication mode includes:
detecting the value of the communication identifier, current communication mode is USB interface communication in the case that the value of the communication identifier is 1; the current communication mode is serial communication in the case that the value of the communication identifier is 2; the communication mode is not set in the case that the value of the communication identifier is 0;

setting the communication mode as serial communication includes: setting the value of the communication identifier as 2;

setting the communication mode as USB interface communication includes: setting the value of the communication identifier as 1.

A method for recognizing a communication mode, wherein, the method includes:

step P1 including powering on a device, initializing, and turning on an interruption;

entering an interruption process when an interruption signal is detected, wherein the interruption process further includes:

step A1 including determining whether the interruption is a USB interruption, executing step A2 in the case that the interruption is a USB interruption; exiting the interruption in the case that the interruption is not a USB interruption;

step A2 including turning off the USB interruption;

step A3 including determining whether a communication mode is set, executing step A5 in the case that the communication mode is set; executing step A4 in the case that the communication mode is not set;
step A4 including setting the communication mode as USB interface communication, executing step A5;
step A5 including turning on the USB interrupt, implementing a USB enumeration, returning a USB interface communication protocol supported by the device to a host, exiting the USB interrupt after the enumeration is finished;
step P2 including determining whether the communication mode is USB interface communication, executing step P13 in the case that the communication mode is USB interface communication; executing step P3 in the case that the communication mode is not USB interface communication;
step P3 including determining whether data is received via a serial port, executing step P4 in the case that the data is received via a serial port; executing step P2 in the case that the data is not received via a serial port;
step P4 including storing received data into a first cache, determining whether data at a first byte stored in the first cache is a first preset value, executing step P6 in the case that the data is the first preset value; executing step P5 in the case that the data is not the first preset value;
step P5 including determining whether the communication mode is USB interface communication, executing step P13 in the case that the communication mode is USB interface communication; returning to step P4 in the case that the communication mode is not a USB interface communication;
step P6 including storing the data into the first cache after all data sent by the host is received via the serial port, verifying the data stored in the first cache and determining whether the data is verified successfully, executing step P7 in the case that the data is verified successfully; returning to step P3 in the case that the data is verified unsuccessfully;
step P7 including setting a serial communication baud rate, setting a communication mode as first serial communication;
step P8 including determining whether the communication mode is the first serial communication, executing step P10 in the case that the communication mode is the first serial communication; executing step P9 in the case that the communication mode is not the first port communication;
step P9 including setting the communication mode as second serial communication, executing step P12;
step P10 including determining whether data is received via a serial port, executing step P11 in the case that the data is received via the serial port; waiting for receiving the data and returning to step P10 in the case that the data is not received via the serial port;
step P11 including storing the data into the first cache when all data sent by the host is received, verifying the data stored in the first cache and determining whether the data is verified successfully, executing step P12 in the case that the data is verified successfully; returning to step P10 in the case that the data is not verified successfully;
step P12 including processing the data in the first cache according to a serial port protocol;
step P13 including waiting for an instruction sent by the host, carrying out a corresponding process according to a USB interface protocol supported by the device when the instruction is received, returning to step P13 when the process is finished.

Optionally, the initialization includes: setting a value of a communication identifier as 0;
determining whether the communication mode is USB interface communication includes: determining whether the value of the communication identifier is 1, the communication mode is the USB interface communication in the case that the value of the communication identifier is 1; the communication mode is not the USB interface communication in the case that the value of the communication identifier is not 1;
setting the communication mode as the first serial communication includes: setting the value of the communication identifier as 4;
determining whether the communication mode is the first serial communication includes: determining whether the value of the communication identifier is 4, the communication mode is the first serial communication in the case that the value of the communication identifier is 4; the communication mode is not the first serial communication in the case that the value of the communication identifier is not 4;
setting the communication mode as the second serial communication includes:
setting the value of the communication identifier as 2.

Optionally, step P12 includes:
step P12-1 including extracting data at first seven bytes in the first cache, determining whether data at a first byte and data at a second byte is a first preset character string, executing step P12-2 in the case that the data at the first byte and the data at the second byte is the first preset character string; returning an error information to the host and returning to step P9 in the case that the data at the first byte and the data at the second byte is not the first preset character string;
step P12-2 including detecting data at the lowest four bits of a fourth byte, executing step P12-3 in the case that the data at the lowest four bits of the fourth byte is a first set value; executing step P12-4 in the case that the data at the lowest four bits of the fourth byte is a second set value; executing step P12-5 in the case that the data at the lowest four bits of the fourth byte is a third set value; returning an error information to the host and returning to step P9 in the case that the data at the lowest four bits of the fourth byte are other values;
step P12-3 including returning hand shake information which includes the serial communication baud rate to the host, returning to step P9;
step P12-4 including returning response data in a second cache to the host, returning to step P9;
step P12-5 including extracting APDU data and a length of data from the first cache, calculating a length of the APDU data, determining whether the length of the APDU data is the same as the length of the data extracted, returning a receiving correct data response to the host and executing step P12-6 in the case that the length of the APDU data is the same as the length of the data extracted; returning a receiving wrong data information to the host and returning to step P9 in the case that the length of the APDU data is not the same as the length of the data extracted;
step P12-6 including processing the APDU data in accordance with a serial port protocol and storing a processed result into the second cache, returning to step P9.

Optionally, the method further includes:
predefining, by the device, the USB interface communication protocol supported by the device, wherein the USB interface communication protocol supported by the device include the CCID protocol, the HID protocol or the SCSI protocol;
wherein returning the USB interface communication protocol supported by the device to the host in step A5 includes: sending, by the device, a value of an IO communication identifier to the host.

Optionally, in the case that a value of the IO communication identifier is the first preset value, step P13 includes:
step P13-11 including waiting for an instruction sent by the host, storing the instruction into the first cache when the instruction is received via the USB interface, parsing the instruction stored in the first cache in accordance with a CCID protocol;
step P13-12 including determining data at a first byte in the parsed result, executing step P13-13 in the case that the data at the first byte is a first preset character; executing step P13-14 in the case that the data at the first byte is a second preset character; executing step P13-15 in the case that the data at the first byte are other characters;
step P13-13 including carrying out a corresponding process to the parsed result, storing a processed result into the second cache, returning the parsed result to the host, returning to step P13-11;
step P13-14 including sending APDU data in the parsed result to a command layer to be processed, storing the processed result into the second cache when the processed result is received, returning the processed result to the host, returning to step P13-11;
step P13-15 including organizing an information error response and storing the information error response into the second cache, returning the information error response to the host, returning to step P13-11.

Optionally, in the case that the value of the IO communication identifier is a second preset value, step P13 includes:
step P13-21 including waiting for an instruction sent by the host, determining a state of a state machine when a Set up package of eight bytes is received via a USB interface, executing step P13-23 in the case that the state of the state machine is sending; executing step P13-22 in the case that the state of the state machine is receiving;
step P13-22 including parsing the Set up package according to an HID protocol, and detecting data at first two bytes in the parsed result, executing step P13-25 in the case that the data at first two bytes in the parsed result is a first character string, returning to step P13-21 in the case that the data at first two bytes in the parsed result are other values;
step P13-23 including parsing the Set up package according to the HID protocol and detecting data at the first two bytes in the parsed result, executing step P13-25 in the case that the data at the first two bytes in the parsed result is the first character string; executing step P13-24 in the case that the data at the first two bytes in the parsed result is a second character string; returning to step P13-21 in the case that the data are other values;
step P13-24 including returning response data in the second cache to the host, setting the state of the state machine as receiving, returning to step P13-21;
step P13-25 including storing the parsed result of the Set up package into the first cache, determining whether the instruction is a hot reset instruction according to the parsed result, executing step P13-26 in the case that the instruction is a hot reset instruction; executing step P13-27 in the case that the instruction is not a hot reset instruction;
step P13-26 including setting response data with a reset parameter, and storing the response data into the second cache, setting the state of the state machine as sending, returning to step P13-21;
step P13-27 including sending the parsed result to the command layer to be processed, receiving a processed result and storing the processed result into the second cache, setting the state of the state as sending, returning to step P13-21.

Optionally, in the case that the value of the IO communication identifier is a third preset value, step P13 includes:
step P13-31 including waiting for an instruction sent by the host, parsing the instruction according to an SCSI protocol when the instruction is received via the USB interface;
step P13-32 including determining whether the received instruction is a valid SCSI instruction according to the parsed result, executing step P13-33 in the case that the received instruction is a valid SCSI instruction; returning to step P13-31 in the case that the received instruction is not a valid SCSI instruction;
step P13-33 including determining whether the received instruction is a standard SCSI instruction according to the parsed result, executing step P13-34 in the case that the received instruction is a standard SCSI instruction; executing step P13-35 in the case that the received instruction is not a standard SCSI instruction;
step P13-34 including carrying out a corresponding process in accordance with the standard SCSI instruction, returning a processed result to the host, returning to step P13-31;
step P13-35 including determining a state of data transfer, executing step P13-36 in the case that the state is sending; executing step P13-37 in the case that the state is receiving;
step P13-36 including returning response data in the second cache to the host, returning to step P13-31;
step P13-37 including storing the parsed result into the first cache, determining whether the received instruction is a hot reset instruction in accordance with the parsed result, executing step P13-38 in the case that the received instruction is a hot reset instruction; executing step P13-39 in the case that the received instruction is not a hot reset instruction;
step P13-38 including setting response data with a reset parameter, and storing the response data into the second cache, setting the state of data transfer as sending, returning to step P13-31;
step P13-39 including sending the parsed result to the command layer to be processed, receiving a processed result and storing the processed result into the second cache, returning to step P13-31.

Optionally, the method further includes:
predefining, by the device, the USB interface communication protocol supported by the device, wherein the USB interface communication protocol supported by the device includes at least two protocols of the CCID protocol, the HID protocol and the SCSI protocol;
wherein returning the USB interface communication protocol supported by the device to the host in step B5 includes: sending, by the device, an IO communication identifier to the host.

Optionally, step P13 includes:
step P13-41 including detecting a value of the IO communication identifier, executing step P13-42 in the case that the value of the IO communication identifier is the first preset value; executing step P13-47 in the case that the value of the IO communication identifier is a second preset value; executing step P13-54 in the case that the value of the IO communication identifier is a third preset value;
step P13-42 including waiting for an instruction sent by the host, storing the instruction into the first cache when the instruction is received via the USB interface, parsing the instruction stored in the first cache in accordance with a CCID protocol;
step P13-43 including determining data at first byte in the parsed result, executing step P13-44 in the case that the data at the first byte is a first preset character; executing step P13-45 in the case that the data at the first byte is a second preset character; executing step P13-46 in the case that the data at the first byte are other values;

step P13-44 including carrying out a corresponding process to the parsed result correspondingly, storing a processed result into the second cache, returning the processed result to the host, returning to step P13-42;

step P13-45 including sending APDU data in the parsed result to a command layer to be processed, receiving a processed result and storing the processed result into the second cache, returning the processed result to the host, returning to step P13-42;

step P13-46 including organizing an information error response and storing the response into the second cache, returning the response to the host, returning to step P13-42;

step P13-47, waiting for an instruction sent by the host, when a Set up package of eight bytes is received via the USB interface, determining a state of a state machine, executing step P13-49 in the case that the state is sending; executing step P13-48 in the case that the state is receiving;

step P13-48 including parsing the Set up package in accordance with an HID protocol, and detecting data at a first two bytes in the parsed result, executing step P13-51 in the case that the data at the first two bytes is a first character string; returning to step P13-47 in the case that the data at the first two bytes are other values;

step P13-49 including parsing the Set up package in accordance with the HID protocol, and detecting data at the first two bytes in the parsed result, executing step P13-51 in the case that the data at the first two bytes is the first character string; executing step P13-50 in the case that the data at the first two bytes is a second character string; returning to step P13-47 in the case that the data at the first two bytes are other values;

step P13-50 including returning response data in the second cache to the host, setting the state of the state machine as receiving, returning to step P13-47;

step P13-51 including storing the parsed result of the Set up package into the first cache, determining whether the instruction is a hot reset instruction in accordance with the parsed result, executing step P13-52 in the case that the instruction is a hot reset instruction; executing step P13-53 in the case that the instruction is not a hot reset instruction;

step P13-52 including setting the response data which includes a reset parameter, and storing the response data into the second cache, setting the state of the state machine as sending, returning to step P13-47;

step P13-53 including sending the parsed result to the command layer to be processed, receiving the processed result and storing the processed result into the second cache, setting the state of the state machine as sending, returning to step P13-47;

step P13-54 including waiting for an instruction sent by the host, parsing the instruction in accordance with a SCSI protocol when the instruction is received via the USB interface;

step P13-55 including determining whether the received instruction is a valid SCSI instruction in accordance with the parsed result, executing step P13-56 in the case that the received instruction is a valid SCSI instruction; executing step P13-54 in the case that the received instruction is not a valid SCSI instruction;

step P13-56 including determining whether the received instruction is a standard SCSI instruction in accordance with the parsed result, executing step P13-57 in the case that the received instruction is a standard SCSI instruction; executing step P13-58 in the case that the received instruction is not a standard SCSI instruction;

step P13-57 including carrying out a corresponding process in accordance with the standard SCSI instruction, returning the processed result to the host, returning to step P13-54;

step P13-58 including determining the state of data transfer, executing step P13-59 in the case that the state is sending; executing step P13-60 in the case that the state is receiving;

step P13-59 including returning response data in the second cache to the host, returning to step P13-54;

step P13-60 including storing the parsed result into the first cache, determining whether the received instruction is a hot reset instruction according to the parsed result, executing step P13-61 in the case that the received instruction is a hot reset instruction; executing step P13-62 in the case that the received instruction is not a hot reset instruction;

step P13-61 including setting the response data which includes a reset parameter, and storing the response data into the second cache, setting the state of data transfer as sending, returning to step P13-54;

step P13-62 including sending the parsed result to the command layer to be processed, receiving the processed result and storing the processed result into the second cache, returning to step P13-54.

A method for recognizing a communication mode, wherein, the method includes:

step L1 including powering on a device, initializing, and turning on an interruption;

step L2 including determining whether a serial interruption is triggered, executing step L3 in the case that the serial interruption is triggered; entering other interruptions in the case that the serial interruption is not triggered, continuing to execute step L3 after the interruption is exited;

step L3 including determining whether a communication mode is USB interface communication, executing step L4 in the case that the communication mode is USB interface communication; executing step L5 in the case that the communication mode is not USB interface communication;

step L4 including receiving an instruction sent by a host, processing the received instruction according to a USB interface communication protocol supported by the device, subsequently, waiting for an instruction sent by the host, returning to step L4;

step L5 including determining whether the communication mode is first serial communication, executing step L6 in the case that the communication mode is the first serial communication; executing step L7 in the case that the communication mode is not the first serial communication;

step L6 including waiting for an instruction sent by the host, carrying out a corresponding process in accordance with a serial port protocol when the instruction is received, returning to step L6 after the operation is finished;

step L7 including detecting a serial port signal, and waiting for a hand shake package sent by the host;

step L8 including determining whether the serial port signal is detected, executing step L9 in the case that the serial port signal is detected; returning to step L2 in the case that the serial port is not detected;

step L9 including receiving data at a first byte sent by the host, and storing the data at the first byte into a first cache, determining whether the data at the first byte is a first preset value, executing step L10 in the case that the data at the first byte is the first preset value; returning to step L2 in the case that the data at the first byte is not the first preset value;

step L10 including when all data sent by the host is received via a serial port, storing the data into the first cache, verifying the data stored in the first cache and determining whether the verifying is successful, executing step L11 in the case that the verifying is successful; returning to step L2 in the case that the verifying is not successful;

step L11 including setting a serial communication baud rate, setting the communication mode as a first serial communication, returning to step L2;

wherein entering other interruptions includes:

step D1 including determining whether a USB interruption is triggered, executing step D2 in the case that the USB interruption is triggered; exiting the interruption in the case that the USB interruption is not triggered;

step D2 including turning off the USB interruption, determining whether a Set up package is received via an endpoint 0, executing step D3 in the case that the Set up package is received via the endpoint 0; turning on the USB interruption and executing step D4 in the case that the Set up package is not received via the endpoint 0;

step D3 including turning on the USB interruption, implementing a USB enumeration, returning the USB interface communication protocol supported by the device to the host, executing step D4;

step D4, setting the communication mode as the USB interface communication, exiting the USB interruption.

Optionally, initializing includes: setting a value of a communication identifier as 0;

determining whether the communication mode is USB interface communication includes: determining whether a value of a communication identifier is 1, the communication mode is the USB interface communication in the case that the value of the communication identifier is 1; the communication mode is not the USB interface communication in the case that the value of the communication identifier is not 1;

setting the communication mode as the first serial communication includes: setting the value of the communication identifier as 4;

determining whether the communication mode is the first serial communication includes: determining whether the value of the communication identifier is 4, the communication mode is the first serial communication in the case that the value of the communication identifier is 4; the communication mode is not the first serial communication in the case that the value of the communication identifier is not 4.

Optionally, step L6 includes:

step L6-1 including receiving serial data and storing it into the first cache;

step L6-2 including extracting data at the first seven bytes from the serial data in the first cache, and determining whether data at a first byte and data at a second byte is a first preset character string, executing step L6-3 in the case that the data at the first byte and the data at the second byte is a first present character string; clearing the communication mode, returning error information to the host, and returning to step L2 in the case that the data at the first byte and the data at the second byte is not the first preset character string;

step L6-3 including detecting data at the lowest four bits of a fourth byte, executing step L6-4 in the case that the data at the lowest four bits of a fourth byte is a first set value; executing step L6-5 in the case that the data at the lowest four bits of a fourth byte is a second set value; executing step L6-6 in the case that the data is a third value;

step L6-4 including returning shake hands information which includes a serial communication baud rate to the host, returning to step L2;

step L6-5 including returning response data in a second cache to the host, returning to step L2;

step L6-6 including extracting APDU data and a length of data from the first cache, calculating a length of the APDU data;

step L6-7 including determining whether the calculated length of the APDU data is the same as the length of the data extracted, returning a receiving correct data response to the host and executing step L6-8 in the case that the length of the APDU data is the same as the length of the data extracted; returning a receiving wrong information to the host in the case that the length of the APDU data is not the same as the length of the data extracted, returning to step L2;

step L6-8 including processing the APDU data according to a serial port protocol, and storing the processed result into the second cache, returning to step L2.

Optionally, the method further includes:

predefining, by the device, a USB interface communication protocol supported by the device, wherein the USB interface communication protocol supported by the device includes a CCID protocol, an HID protocol or the SCSI protocol;

returning the USB interface communication protocol supported by the device to the host in step D3 includes:

sending, by the device, a value of an IO communication identifier to the host.

Optionally, in the case that the value of the IO communication identifier is the first preset value, step L4 includes:

step L4-11 including waiting for an instruction sent by the host, when the instruction is received via the USB interface, storing the instruction into the first cache, parsing the instruction in the first cache in accordance with the CCID protocol;

step L4-12 including determining data at a first byte in the parsed result, executing step L4-13 in the case that the data at the first byte in the parsed result is a first preset character; executing step L4-14 in the case that the data at the first byte in the parsed result is a second preset character; executing step L4-15 in the case that the data are other values;

step L4-13 including carrying out a corresponding process to the parsed result, and storing a processed result into the second cache, returning the processed result to the host, returning to step L4-11;

step L4-14 including sending APDU data in the parsed result to a command layer to be processed, storing a processed result into the second cache when the processed result is received, returning the processed result to the host, returning to step L4-11;

step L4-15 including organizing an information error response and storing the information error response into the second cache, returning the information error response to the host, returning to step L4-11;

Optionally, in the case that the value of the IO communication identifier is a second preset value, step L4 includes:

step L4-21 including waiting for an instruction sent by the host, determining a state of a state machine when a Set up package of eight bytes is received via the USB interface, executing step L4-23 in the case that the state of the state machine is sending; executing step L4-22 in the case that the state of the state machine is receiving;

step L4-22 including parsing the Set up package according to the HID protocol, and detecting data at the first two bytes in the parsed result, executing step L4-25 in the case that the data at the first two bytes of the parsed result is a first character string; returning to step L4-21 in the case that the data at the first two bytes are other values;

step L4-23 including parsing the Set up package according to the HID protocol, and detecting data at the first two bytes in the parsed result, executing step L4-25 in the case that the data at the first two bytes of the parsed result is the first character string; executing step L4-24 in the case that the data at the first two bytes of the parsed result is a second character string; returning to step L4-21 in the case that the data at the first two bytes are other values;

step L4-24 including returning response data in the second cache to the host, setting the state of the state machine as receiving, returning to step L4-21;

step L4-25 including storing the parsed result of the Set up package into the first cache, determining whether the instruction is a hot reset instruction according to the parsed result, executing step L4-26 in the case that the instruction is a hot reset instruction; executing step L4-27 in the case that the instruction is not a hot reset instruction;

step L4-26 including setting response data which includes a reset parameter, storing the response data into the second cache, setting the state of the state machine as sending, returning to step L4-21;

step L4-27 including sending the parsed result to the command layer to be processed, receiving a processed result and storing the processed result into the second cache, setting the state of the state machine as sending, returning to step L4-21;

Optionally, in the case that the value of the IO communication identifier is a third preset value, step L4 includes:

step L4-31 including waiting for an instruction sent by the host, parsing the instruction according to the SCSI protocol when the instruction is received via the USB interface;

step L4-32 including determining whether the received instruction is a valid SCSI instruction, executing step L4-33 in the case that the received instruction is a valid SCSI instruction; returning to step L4-31 in the case that the received instruction is not a valid SCSI instruction;

step L4-33 including determining whether the received instruction is a standard SCSI instruction according to the parsed result, executing step L4-34 in the case that the received instruction is a standard SCSI instruction; executing step L4-35 in the case that the received instruction is not a standard SCSI instruction;

step L4-34 including carrying out a corresponding process in accordance with the standard SCSI instruction, returning a processed result to the host, returning to step L4-31;

step L4-35 including determining a state of data transfer, executing step L4-36 in the case that the state of data transfer is sending; executing step L4-37 in the case that the state of data transfer is receiving;

step L4-36 including returning response data into the second cache to the host, returning to step L4-31;

step L4-37 including storing the parsed result into the first cache, determining whether the received instruction is a hot reset instruction according to the parsed result, executing step L4-38 in the case that the received instruction is a hot reset instruction; executing step L4-39 in the case that the received instruction is not a hot reset instruction;

step L4-38 including setting the response data which includes a reset parameter, and storing the response data into the second cache, setting the state of data transfer as sending, returning to step L4-31;

step L4-39 including sending the parsed result to the command layer to be processed, receiving the processed result and storing the processed result into the second cache, returning to step L4-31.

Optionally, the method further includes:

predefining, by the device, a USB interface communication protocol supported by the device, wherein the USB interface communication protocol supported by the device includes at least two protocols of the CCID protocol, the HID protocol and the SCSI protocol;

returning the USB interface communication protocol supported by the device to the host in step B5, including: sending, by the device, the IO communication identifier to the host.

Optionally, step L4 includes:

step L4-41 including detecting a value of the IO communication identifier, executing step L4-42 in the case that the value of the IO communication identifier is a first preset value; executing step L4-47 in the case that the value of the IO communication identifier is a second preset value; executing step L4-54 in the case that the value of the IO communication identifier is a third preset value;

step L4-42 including waiting for an instruction sent by the host, storing the instruction into the first cache when the instruction is received via the USB interface, parsing the instruction in the first cache in accordance with the CCID protocol;

step L4-43 including determining data at the first byte in a parsed result, executing step L4-44 in the case that the data at the first byte in the parsed result is a first preset character; executing step L4-45 in the case that the data at the first byte in the parsed result is a second preset character; executing step L4-46 in the case that the data at the first byte in the parsed result are other values;

step L4-44 including carrying out a corresponding process on the parsed result, storing a processed result into a second cache, returning the processed result to the host, returning to step L4-42;

step L4-45 including sending the APDU data in the parsed result to a command layer to be processed storing the parsed result into the second cache when a processed result is received, returning the processed result to the host, returning to step L4-42;

step L4-46 including organizing the information error response and storing the information error response into the second cache, returning the information error response to the host, returning to step L4-42;

step L4-47 including waiting for an instruction sent by the host, determining a state of a state machine when the Set up package of eight bytes is received via the USB interface, executing step L4-49 in the case that the state of the state machine is sending; executing step L4-48 in the case that the state of the state machine is receiving;

step L4-48 including parsing the Set up package according to the HID protocol, detecting the data at first two bytes in the parsed result, executing step L4-51 in the case that the data at the first two bytes is a first character string; returning to step L4-47 in the case that the data at the first bytes in the parsed result are other values;

step L4-49 including parsing the Set up package in accordance with the HID protocol, and detecting data at the first two bytes in the parsed result, executing step L4-51 in the case that the data at the first two bytes is the first character string; executing step L4-50 in the case that the data at the first two bytes is a second character string; returning to step L4-47 in the case that the data are other values;

step L4-50 including returning response data in the second cache to the host, setting the state of the state machine as receiving, returning to step L4-47;

step L4-51 including storing the parsed result of the Set up package into the first cache, determining whether the instruction is a hot reset instruction according to the parsed result, executing step L4-52 in the case that the instruction is a hot reset instruction; executing step L4-53 in the case that the instruction is not a hot reset instruction;

step L4-52 including setting a response data which includes a reset parameter, and storing the response data into the second cache, setting the state of the state machine as sending, returning to step L4-47;

step L4-53 including sending the parsed result to a command layer to be processed, receiving a processed result and storing the processed result into the second cache, setting the state of the state machine as sending, returning to step L4-47;

step L4-54 including waiting for an instruction sent by the host, parsing the instruction in accordance with the SCSI protocol when the instruction is received via the USB interface;

step L4-55 including determining whether the received instruction is a valid SCSI instruction in accordance with the parsed result, executing step L4-56 in the case that the received instruction is a valid SCSI instruction; returning to step L4-54 in the case that the received instruction is not a valid SCSI instruction;

step L4-56 including determining whether the received instruction is a standard SCSI instruction according to the parsed result, executing step L4-57 in the case that the received instruction is a standard SCSI instruction; executing step L4-58 in the case that the received instruction is not a standard SCSI instruction;

step L4-57 including carrying out a corresponding process in accordance with the standard SCSI instruction, and returning a processed result to the host, returning to step L4-54;

step L4-58 including determining the state of data transfer, executing step L4-59 in the case that the state is sending; executing step L4-60 in the case that the state is receiving;

step L4-59 including returning response data in the second cache to the host, returning to step L4-54;

step L4-60 including storing the parsed result into the first cache, determining whether the received instruction is a reset instruction in accordance with the parsed result, executing step L4-61 in the case that the received instruction is a hot reset instruction; executing step L4-62 in the case that the received instruction is not a hot reset instruction;

step L4-61 including setting the response data which includes a reset parameter, and storing the response data into the second cache, setting the state of data transfer as sending, returning to step L4-54;

step L4-62 including sending the parsed result to the command layer to be processed, receiving a processed result and storing the processed result into the second cache, returning to step L4-54.

Compared to the conventional technology, the present disclosure has following advantages:

The method of the present disclosure can not only be applied in present products, but also be applied in serial port products of old version, in this way the method could improve compatibility and inheritance of products so as to avoid huge expenditure because of weeding out products of old version.

DETAILED DESCRIPTION OF THE PREFERRED EMBODIMENTS

The technical solution in the embodiments of the present invention is further described more clearly and completely with the drawings in the embodiments of the present disclosure. Apparently, embodiments described are just a few of all embodiments of the present disclosure. On the basis of embodiments of the disclosure, all other related embodiments made by common technicians of the field without creative work belong to the scope of the disclosure.

Embodiment 1

Figure 1:
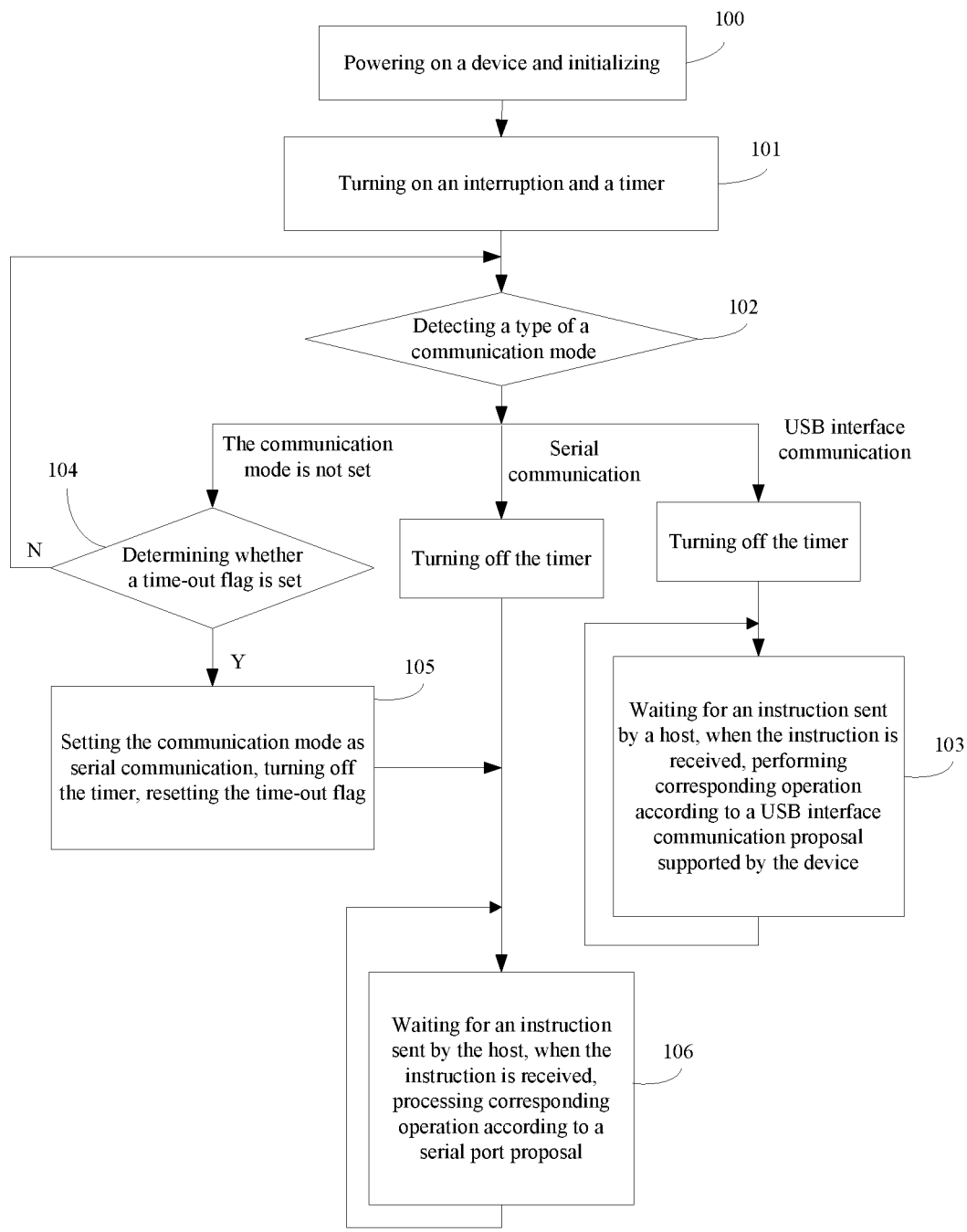
FIG. 1 is a flow diagram illustrating a method for recognizing communication mode in accordance with Embodiment 1 of the present disclosure.

Embodiment 1 of the present disclosure provides a method for recognizing a communication mode, as shown in FIG. 1, the method includes from step 101 to step 106.

In step 100, a device is powered on and initialized.

In the present embodiment, initializing the device includes: the device and a clock frequency is configured, an IO work module of the device is configured, a module clock is configured enable, a work mode of a timer is configured, a communication identifier is reset, a USB module is initialized, a serial module is initialized, a time-out flag is reset, a state of a state machine is set as sending.

In step 101, an interruption and the timer is turned on.

The interruption in the present embodiment includes a serial port interruption, a USB interruption and a clock interruption. In the present embodiment, the timer is timing when the timer is turned on. The clock interruption is triggered when a preset duration is passed. Optionally, the preset duration may be 50 ms. The clock interruption includes: the timer is turned off, the time-out flag is set, the timer is turned on, the clock interruption is exited.

In step 102, a type of a communication mode is detected, the timer is turned off and step 103 is executed in the case that the communication mode is USB interface communication; the timer is turned off and step 106 is executed in the case that the communication mode is serial communication; step 104 is executed in the case that the communication mode is not set.

In the preset embodiment, a value of a communication identifier is determined, the communication mode is the serial communication in the case that the value of the communication identifier is 1; the communication mode is the USB interface communication in the case that the value is 2; the communication mode is not set in the case that the value is 0.

In step 103, an instruction sent by a host is waited for, a corresponding operation is performed according to the USB interface communication protocol supported by the device when the instruction is received, step 103 is returned to after the operation is finished.

Figure 2:
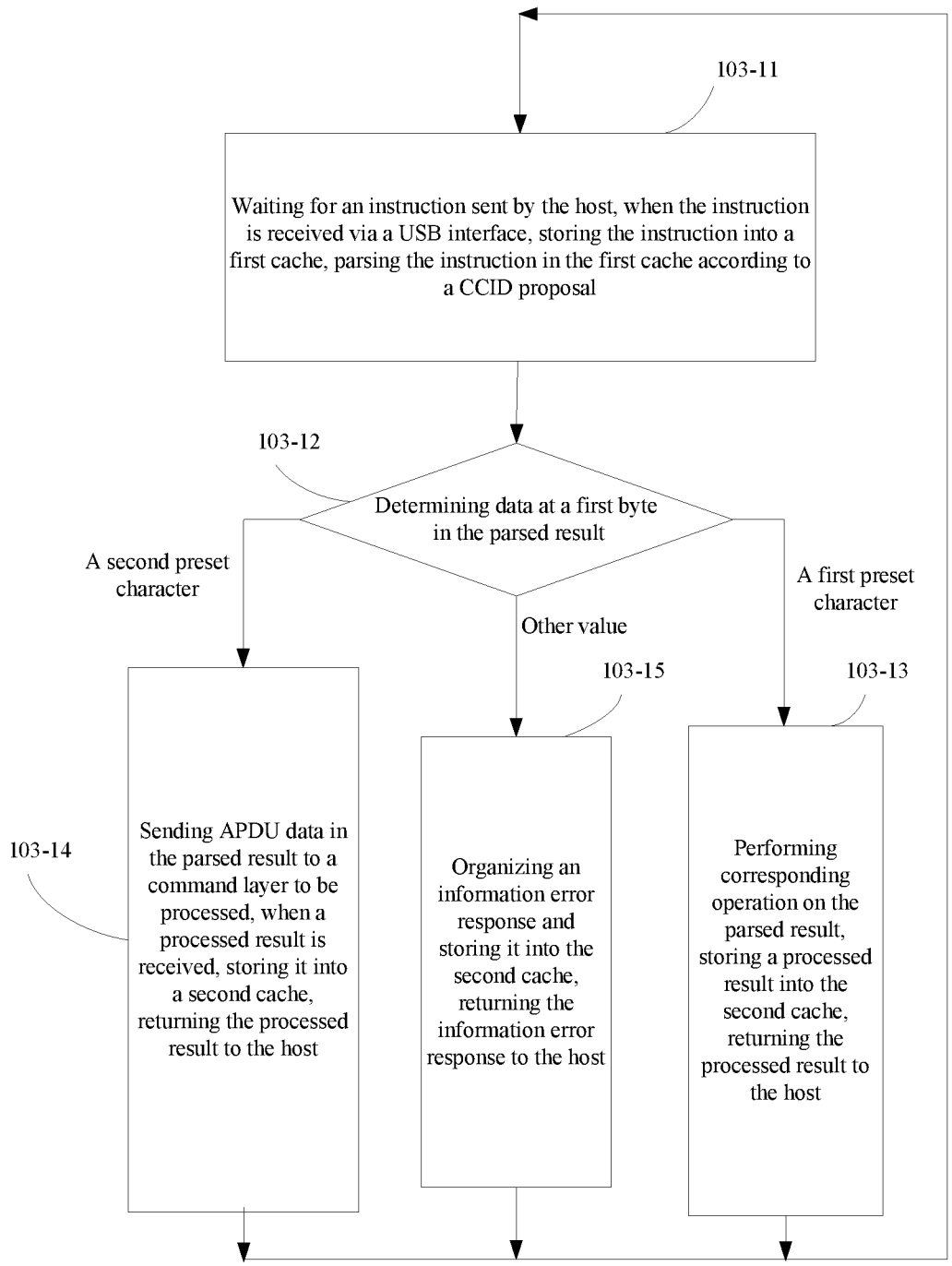
FIG. 2 is a flow diagram illustrating details of step 103 when the device supports CCID protocol in accordance with Embodiment 1 of the present disclosure.

In the present embodiment, via an IO communication identifier, the device predefines that the device only supports one type of communication protocols, the USB interface communication protocol supported by the device is returned to the host in a process of enumeration. For instance, a value of a returned IO communication identifier is a first preset value. Optionally, the USB interface communication protocol supported by the device is a CCID protocol in the case that the first preset value is 1. As shown in FIG. 2, step 103 includes step 103-11 to step 103-15.

In step 103-11, an instruction sent by the host is waited for, the instruction is stored into a first cache when the instruction is received via a USB interface, and the instruction stored in the first cache is parsed according to the CCID protocol.

In step 103-12, data at a first byte in a parsed result is determined, step 103-13 is executed in the case that the data at the first byte is a first preset character; step 103-14 is executed in the case that the data at the first byte is a second preset character; step 103-15 is executed in the case that the data are other values.

In the present embodiment, the first preset character may be 0x61, 0x62, 0x63, 0x6A, 0x6C or 0x6D. Optionally, the first preset character may be 0x61 in the present embodiment; the second preset embodiment may be 0x6F.

In step 103-13, the parsed result is processed correspondingly, and a processed result is stored into a second cache, the process result is returned to the host, step 103-11 is returned to.

In step 103-14, APDU data in the parsed result is sent to a command layer to be processed, the processed result is stored into the second cache when it is received, the processed result is returned to the host, step 103-11 is returned to.

In step 103-15, an information error response is organized and stored into the second cache, the information error response is returned to the host, step 103-11 is returned to.

Figure 3:
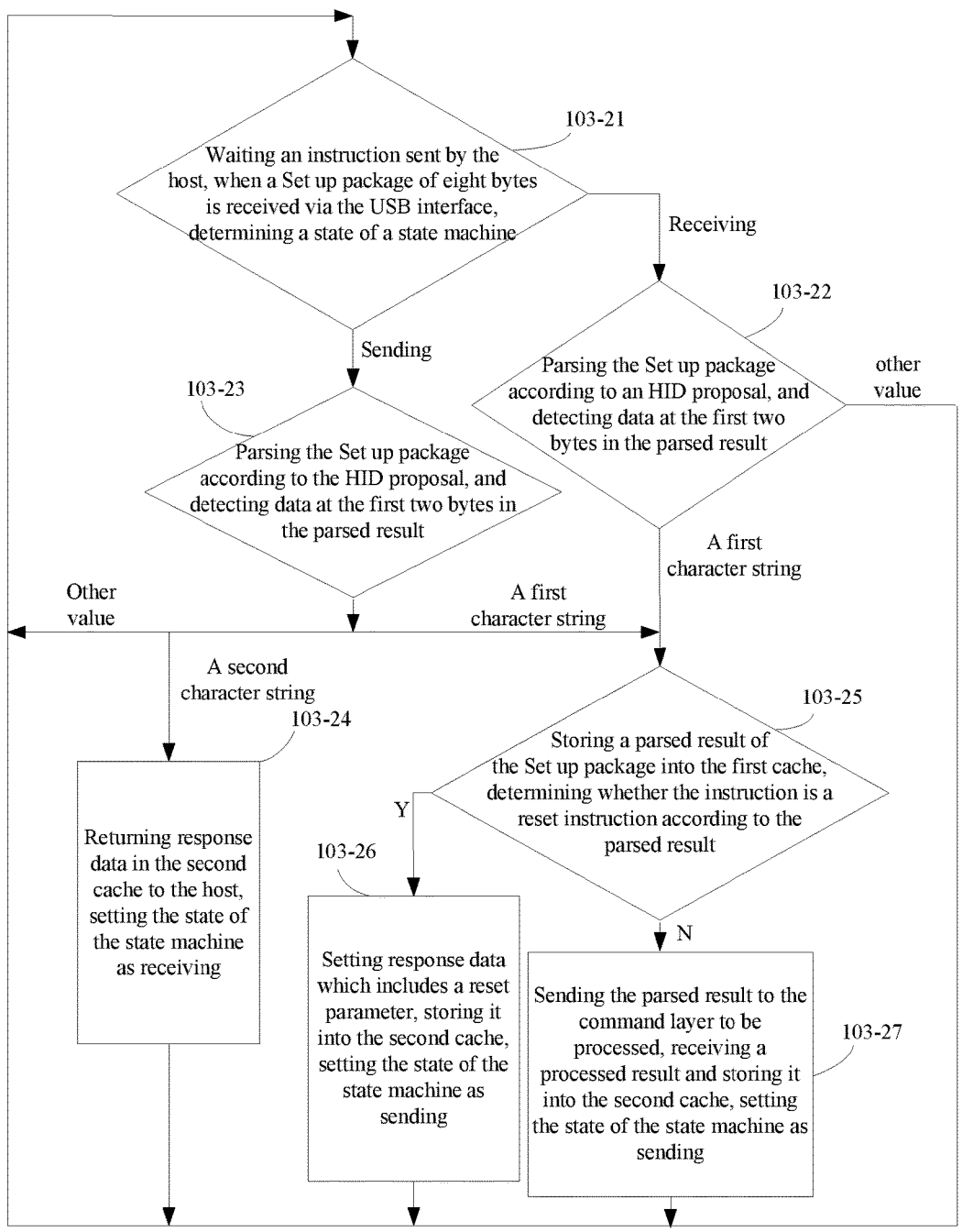
FIG. 3 is a flow diagram illustrating details of step 103 when the device supports HID protocol in accordance with Embodiment 1 of the present disclosure.

In the present embodiment, via the IO communication identifier, the device predefines that the device only supports one type of communication protocols, the USB interface communication protocol supported by the device is returned to the host in the process of enumeration, for instance, a value of a returned the IO communication identifier is a second preset value. Optionally, the USB interface communication protocol supported by the device is an HID protocol in the case that the second preset value is 3. As shown in FIG. 3, step 103 includes step 103-21 to step 103-27.

In step 103-21, an instruction sent by the host is waited for, when a Set up package of eight bytes is received via the USB interface, the state of the state machine is determined, step 102-23 is executed in the case that the state is sending; step 103-22 is executed in the case that the state is receiving.

In the present embodiment, a state machine identifier is determined in step 103-21. The state machine identifier being 1 indicates sending; the state machine identifier being 2 indicates receiving.

In step 103-22, the Set up package is parsed in accordance with the HID protocol, data at the first two bytes in the parsed result is detected, step 103-25 is executed in the case that the data at the first two bytes is a first character string; step 103-21 is returned to in the case that the data at the first two bytes are other values.

In the present embodiment, the first character string may be 0x21 0x09.

In step 103-23, the Set up package is parsed in accordance with the HID protocol, the data at the first two bytes in the parsed result is detected, step 103-25 in the case that the data at the first two bytes is the first character string; step 103-24 is executed in the case that the data at the first two bytes is a second character string; step 103-21 is executed in the case that the data at the first two bytes are other values.

In the present embodiment, the first character string may be 0x21 0x09; the second character string may be 0xA1 0x01.

In step 103-24, response data in the second cache is returned to the host, the state of the state machine is set as receiving, step 103-21 is returned to.

In step 103-25, the parsed result of the Set up package is stored into the first cache, determine whether the instruction is a reset instruction in accordance with the parsed result, execute step 103-26 in the case that the instruction is a reset instruction; execute step 103-27 in the case that the instruction is not a reset instruction.

In the present embodiment, it's determined that whether data at the first five bytes is preset data, the instruction is a reset instruction in the case that the data at the first five bytes is the preset data; the instruction is not a reset instruction in the case that the data at the first five bytes is not the preset data. The preset data in the preset embodiment may be 0x46 0x54 0x52 0x53 0x54.

In step 103-26, response data which includes a reset parameter is set and stored into the second cache, the state of the state machine is set as sending, step 103-21 is returned to.

In the present embodiment, the reset parameter includes waiting time and communication rate, etc. The state of the state machine being set as sending may be that the state machine identifier is set as 2.

In step 103-27, the parsed result is sent to the command layer and is processed, a processed result is received and stored into the second cache, the state of the state machine is set as sending, step 103-21 is returned to.

The state of the state machine being set as sending in this step may be that the state machine identifier is set as 2.

Figure 4:
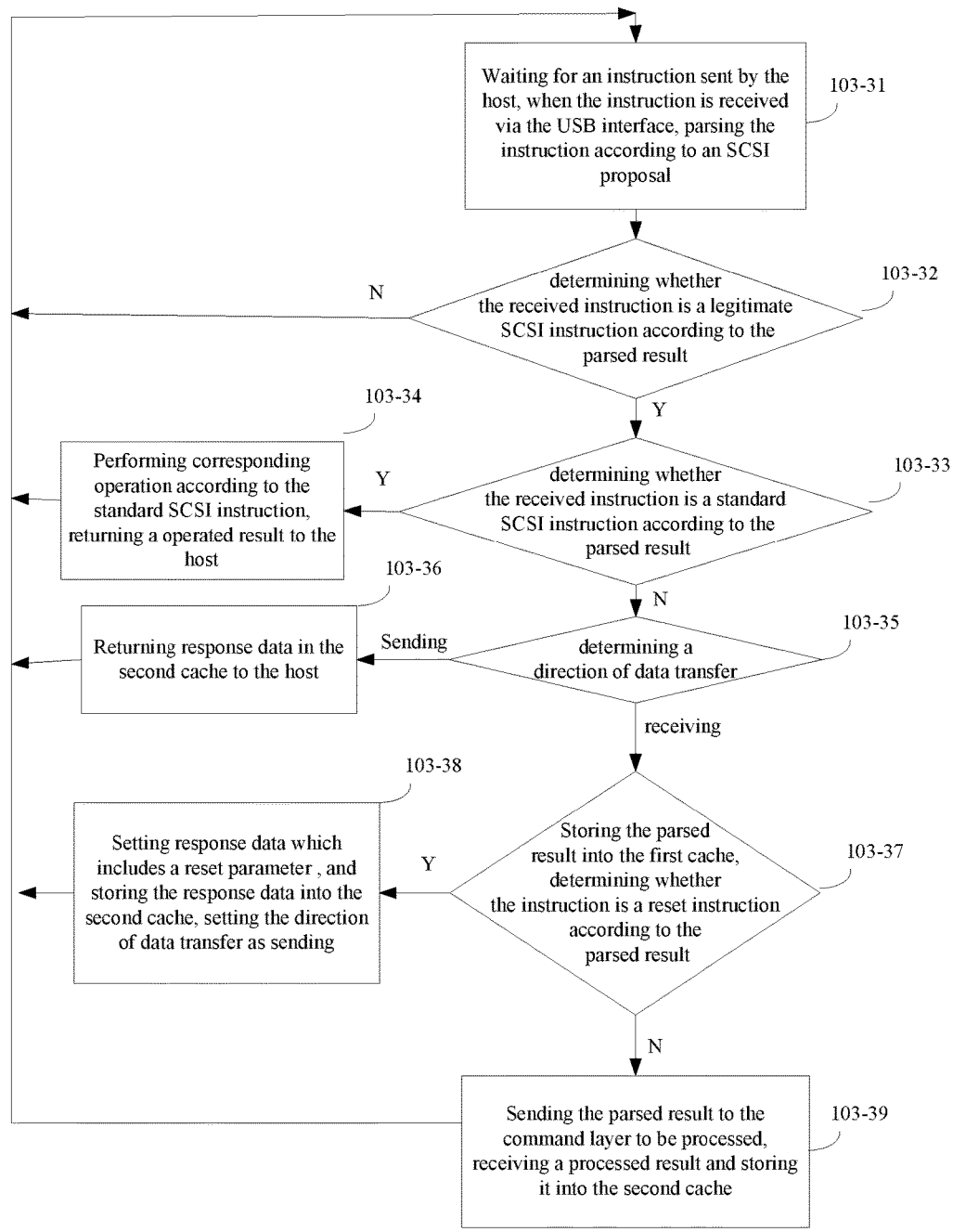
FIG. 4 is a flow diagram illustrating details of step 103 when the device supports SCSI protocol in accordance with Embodiment 1 of the present disclosure.

In the present embodiment, the device predefined that the device only supports one type of USB interface communication protocols, the USB interface communication protocol supported by the device is returned to the host in the process of enumeration. For instance, a value of a returned IO communication identifier is a third preset value. Optionally, the USB interface communication protocol is an SCSI protocol in the case that the third preset value is 5. As shown in FIG. 4, step 103 includes step 103-31 to step 103-39.

In step 103-31, an instruction sent by the host is waited for, the instruction is parsed according to the SCSI protocol when the instruction is received via the USB interface.

In step 103-32, it's determined that whether the received instruction is a valid SCSI instruction in accordance with the parsed result, execute step 103-33 in the case that the received instruction is a valid SCSI instruction; return to step 103-31 in the case that the received instruction is not a valid SCSI instruction.

In the present embodiment, it's determined that whether data at the first four bytes in the parsed result is 0x 55 53 42 43, the instruction is a valid instruction in the case that the data is 0x 55 53 42 43; the instruction is not a valid instruction in the case that the data is not 0x 55 53 42 43.

In step 103-33, it's determined that whether the instruction is a standard SCSI instruction in accordance with the parsed result, execute step 103-34 in the case that the instruction is a standard SCSI instruction; execute step 103-35 in the case that the instruction is not a standard SCSI instruction.

In the present embodiment, it's determined that whether data at a sixteenth byte in the parsed result is larger than 0xFC, the instruction is a standard SCSI instruction in the case that the data at a sixteenth byte is larger than 0xFC; the instruction is not a standard SCSI instruction in the case that the data at a sixteenth byte is not larger than 0xFC.

In step 103-34, corresponding operation is performed in accordance with the standard SCSI instruction, the operated result is returned to the host, step 103-31 is returned to.

In step 103-35, a state of data transfer is determined, step 103-36 is executed in the case that the state is sending; step 103-37 is executed in the case that the state is receiving.

In step 103-36, response data in the second cache is returned to the host, step 103-31 is returned to.

In step 103-37, the parsed result is stored into the first cache, it's determined that whether the instruction is a reset instruction in accordance with the parsed result, execute step 103-38 in the case that the instruction is a reset instruction; execute step 103-39 in the case that the instruction is not a reset instruction;

In step 103-38, response data which includes a reset parameter is set and stored into the second cache, the state of data transfer is set as sending, and step 103-31 is returned to.

In step 103-39, the parsed result is sent to the command layer and is processed, a processed result is received and stored into the second cache, step 103-31 is returned to.

In step 104, it's determined that whether the time-out flag is set, execute step 105 in the case that the time-out flag is set; return to step 102 in the case that the time-out flag is not set.

In the present embodiment, it's determined that whether the time-out flag is "true", the time-out flag is set in the case that the time-out flag is "true"; the time-out flag is not set in the case that the time-out flag is not "true".

In step 105, the communication mode is set as serial communication, the timer is turned off, the time-out flag is reset, step 106 is executed.

In step 106, an instruction sent by the host is waited for, a corresponding operation is performed in accordance with the serial communication protocol when the instruction is received, step 106 is returned to after the operation is finished.

Figure 5:
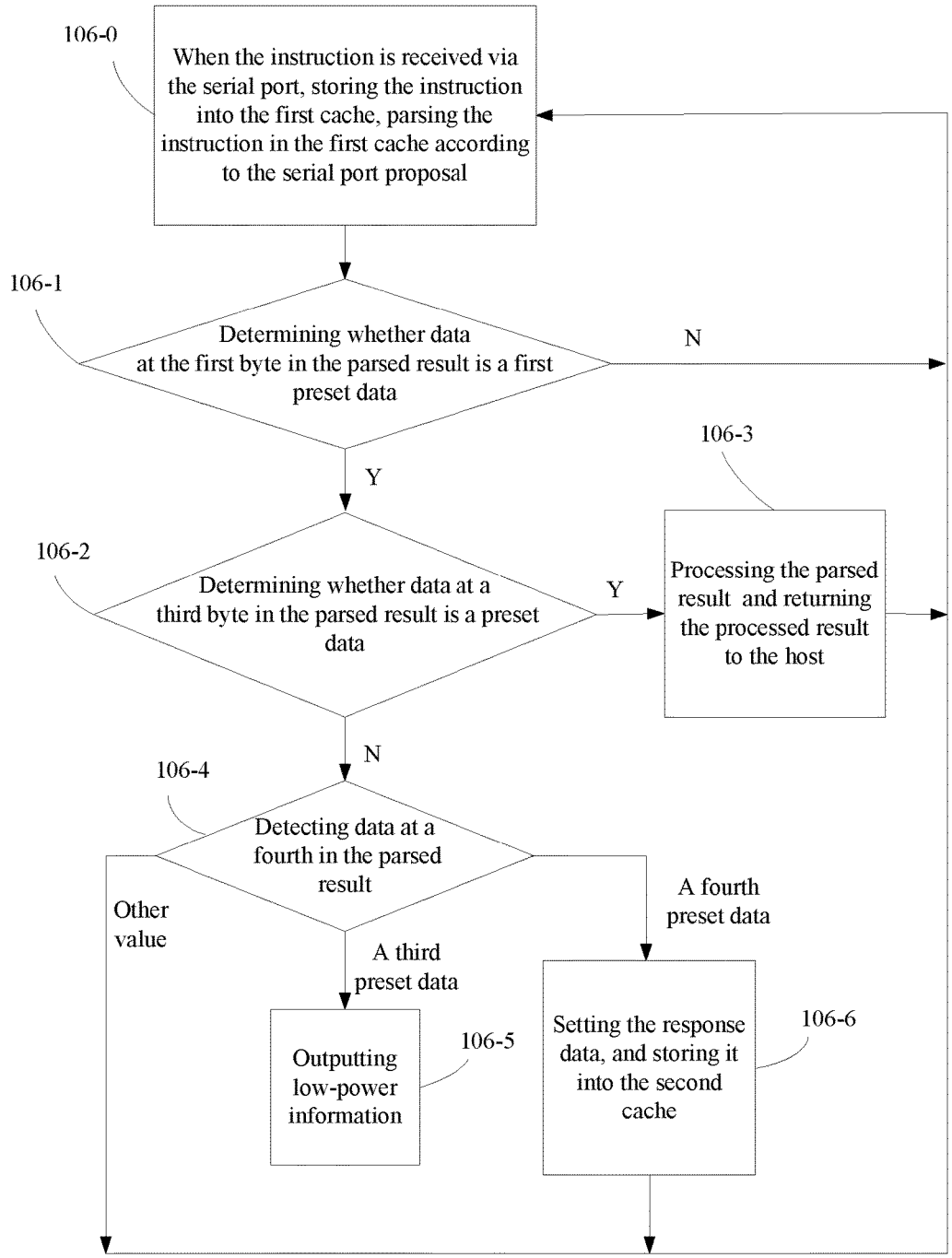
FIG. 5 is a flow diagram illustrating details of step 106 in Embodiment 1 of the present disclosure.

In the present embodiment, as shown in FIG. 5, step 106 includes step 106-0 to step 106-6.

In step 106-0, the instruction is stored into the first cache when the instruction is received via a serial port, the instruction stored in the first cache is parsed in accordance with the serial communication protocol.

In step 106-1, it's determined that whether data at a first byte in the parsed result is first preset data, executing step 106-2 in the case that the data at the first byte is the first preset data; returning to step 106-0 in the case that the data at the first byte is not the first preset data.

In the present embodiment, the first preset data may be 0xF5.

In step 106-2, it's determined that whether data at a third byte in the parsed result is second preset data, executing step 106-3 in the case that the data at the third byte is the second preset data; executing step 106-4 in the case that the data at the third byte is not the second preset data.

The second preset data in the present embodiment may be 0x03.

In step 106-3, the parsed result is processed and a processed result is returned to the host, step 106-0 is returned to.

In step 106-4, data at a fourth byte in the parsed result is detected, step 106-5 is executed in the case that the data at the fourth byte is a third preset data; step 106-6 is executed in the case that the data at the fourth byte is a fourth preset data; step 106-0 is returned to in the case that the data at the fourth byte are other values.

In the present embodiment, the third preset data may be 0x02, the fourth data may be 0x01.

In step 106-5, low battery information is output, the procedure is ended.

In step 106-6, response data is set and stored into the second cache, step 106-0 is returned to.

In the present embodiment, the response data in the step includes a communication baud rate between the device and the host, and a length of transmission data.

Figure 6:
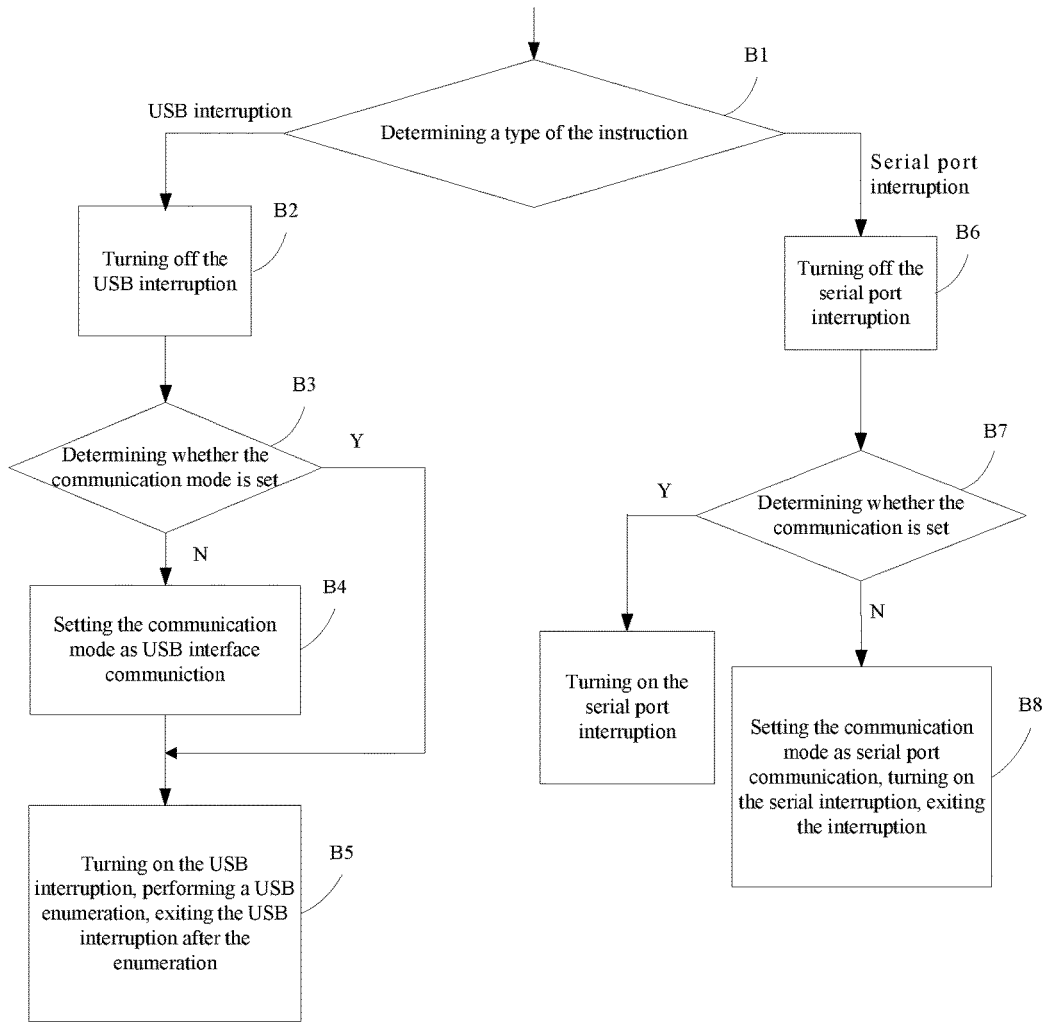
FIG. 6 is a flow diagram of processing when other interruption signal is received in accordance with Embodiment 1 of the present disclosure.

In the present embodiment, when other interruption signals are detected in the process of recognizing the communication mode, other interruptions are processed, work is continued when other interruptions are processed. As shown in FIG. 6, the process of other interruptions includes step B1 to step B8.

In step B1, a type of the interruption is determined, step B2 is executed in the case that the interruption is a USB interruption; step B6 is executed in the case that the interruption is a serial port interruption.

In the present embodiment, an interruption type may be determined in accordance with a flag bit in an interrupt flag register, the interruption is a USB interruption in the case that a value of the flag bit is 1; the interruption is a serial port interruption in the case that the value of the flag bit is 2.

In step B2, the USB interruption is turned off;

Step B2 may be that the value of the flag bit in the interrupt flag register is set as 0.

In step B3, it's determined that whether the communication mode is set, executing step B5 in the case that the communication is set; executing step B4 in the case that the communication mode is not set.

In the present embodiment, it's determined that whether a value of a communication identifier is 0, executing step B4 in the case that the value of the communication identifier is 0; executing step B5 in the case that the value of the communication identifier is not 0.

In step B4, the communication mode is set as the USB interface communication, step B5 is executed.

In the present embodiment, step B4 may be: the value of the communication identifier is set as 2.

In step B5, the USB interruption is turned on, a USB enumeration is implemented, the USB interruption is exited after the USB enumeration is finished.

In the present embodiment, the enumeration may be: the USB interface communication protocol supported by the device is returned to the host, optionally, a value of an IO communication flag is returned. The USB interface communication protocol supported by the device is the CCID protocol in the case that the value of the IO communication identifier is the first preset value, i.e., the instruction of the CCID protocol could be parsed and processed by the device. The USB interface communication protocol supported by the device is the HID protocol in the case that the value of the IO communication identifier is the second preset value, i.e., the instruction of the HID protocol could be parsed and processed by the device. The USB interface communication protocol supported by the device is the SCSI protocol in the case that the value of the IO communication identifier is the third preset value, i.e., the instruction of the SCSI protocol could be parsed and processed by the device. Optionally, the first preset value is 1, the second preset value is 3, and the third preset value is 5.

In step B6, the serial port interruption is turned off.

Step B6 may be that the value of the flag bit in the interrupt flag register is set as 0.

In step B7, it's determined that whether a communication mode is set, the serial port interruption is turned on and the interruption is exited in the case that the communication mode is set; step B8 is executed in the case that the communication mode is not set.

In the present embodiment, the communication identifier is detected, the communication mode is the USB interface communication in the case that the value of the communication identifier is 2; the communication mode is the serial communication in the case that the value of the communication identifier is 1; the communication mode is not set in the case that the value of the communication identifier is 0.

In step B8, the communication mode is set as the serial communication, the serial port interruption is turned on; the serial port interruption exits.

In the present embodiment, the communication mode being set as serial communication may be that the communication identifier is set as 1.

Step 106 in the present embodiment includes: the communication mode is set as the serial communication when the instruction that for setting the communication mode is received; correspondingly, step B8 includes: the first data package is discarded, the serial port interruption is turned on, and the serial port interruption is exited.

In the present embodiment, it may be predetermined that the device could support multiple of USB interface communication protocols, for instance, the device could support two or three protocols of the CCID protocol, the HID protocol or the SCSI protocol. Returning USB interface communication protocol supported by the device to the host includes: an IO communication identifier is sent to the host by the device, the device supports the CCID protocol in the case that the value of the IO communication identifier is a first preset value; the device supports the HID protocol in the case that the value of the IO communication identifier is a second preset value; the device supports the SCSI protocol in the case that the value of the IO communication identifier is the third preset value.

Correspondingly, step 103 in the present embodiment includes:

step 103-41 including: the value of IO communication identifier is detected, the received instruction is processed according to the CCID protocol if the value is the first preset value; the received instruction is processed according to the HID protocol if the value is the second preset value; the received instruction is processed according to the SCSI protocol if the value is the third preset value.

In the present embodiment, details about processing the received instruction according to the CCID protocol may refer to step 103-11 to step 103-15 above; details about processing the received instruction according to the HID protocol may refer to step 103-21 to step 103-27 above; details about processing the received instruction according to the SCSI protocol may refer to step 103-31 to step 103-39 above. The implementation of processing the received instruction will not be repeated herein.

Embodiment 2

Figure 7:
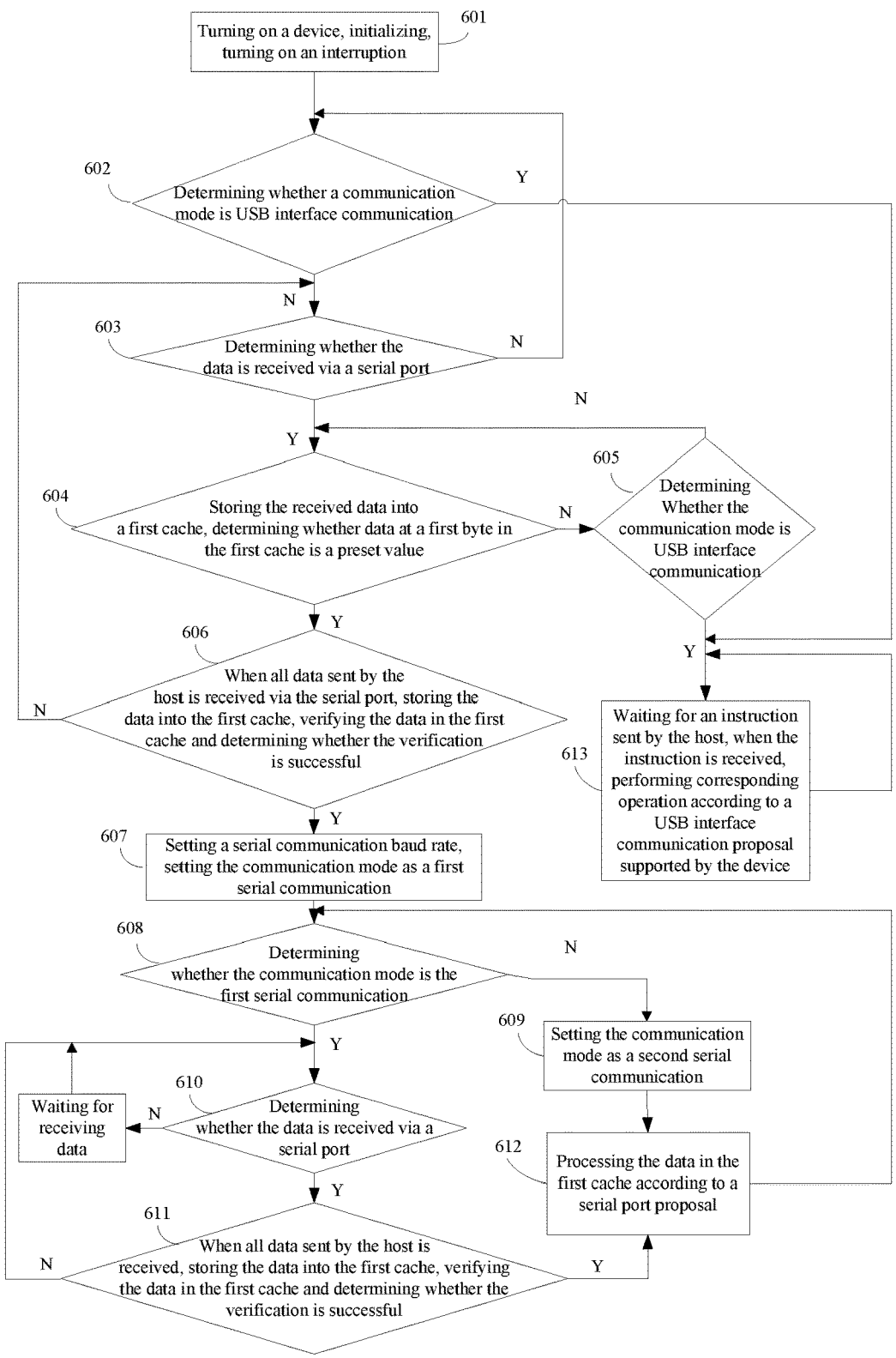
FIG. 7 is a flow diagram illustrating a method for recognizing communication mode in accordance with Embodiment 2 of the present disclosure.

Embodiment 2 of the present disclosure provides a method for recognizing a communication mode, as shown in FIG. 7, the method includes step 601 to step 612.

In step 601, a device is powered on and initialized, an interruption is turned on.

Initializing the device in the present embodiment may include: a value of a communication identifier is set as 0, a timer is turned on.

Turning on the interruption in the present embodiment may include: a serial port interruption, a USB interruption and a clock interruption are turned on.

In step 602, it's determined that whether a communication mode is USB interface communication, executing step 613 in the case that the communication mode is the USB interface communication; executing step 603 in the case that the communication mode is not the USB interface communication.

In the present embodiment, step 602 may include: determining whether a value of a communication identifier is 1, the communication mode being the USB interface communication in the case that the value of the communication identifier is 1; the communication mode not being the USB interface communication in the case that the value of the communication identifier is not 1.

In step 603, it's determined that whether data is received via a serial port, executing step 604 in the case that the data is received via a serial port; returning to step 602 in the case that the data is not received via a serial port.

In step 604, the received data is stored into a first cache, it's determined that whether data at a first byte in the first cache is a first preset value, executing step 606 in the case that the data is the first preset value; executing step 605 in the case that the data is not the first preset value.

In the present embodiment, the first preset value may be 0x0F.

In step 605, it's determined that whether the communication mode is USB interface communication, executing step 613 in the case that the communication mode is the USB interface communication; returning to step 604 in the case that the communication mode is not the USB interface communication.

In step 606, when all data sent by the host is received via the serial port, the data is stored into the first cache, the data in the first cache is verified and whether the data is successfully verified is determined, step 607 is executed in the case that the data is successfully verified; step 603 is returned to in the case that the data is not successfully verified.

In the present embodiment, all the data except for data at the first byte and data at the last byte in the ache is calculated; determine whether a calculated result is the same as the data at the last byte, the data is successfully verified in the case that the calculated result is the same as the data at the last byte; the data is not successfully verified in the case that the calculated result is not the same as the data at the last byte.

In step 607, a serial communication baud rate is set, and the communication mode is set as a first serial communication.

In the present embodiment, setting the communication mode as the first serial communication may include: the value of the communication identifier being set as 4; the received data under the first serial communication mode being a hand shake command.

In step 608, it's determined that whether the communication mode is the first serial communication, executing step 610 in the case that the communication mode is the first serial communication; executing step 609 in the case that the communication mode is not the first serial communication.

In the present embodiment, step 608 may include: determining whether the value of the communication identifier is 4, executing step 610 in the case that the value of the communication identifier is 4; executing step 609 in the case that the value of the communication identifier is not 4.

In step 609, the communication mode is set as a second serial communication, step 612 is executed.

In the present embodiment, step 609 may include: setting the value of the communication identifier as 2;

In the present embodiment, when the communication mode of the device is the second serial communication, the serial data can be received and processed according to the serial port protocol.

In step 610, it's determined that whether data is received via a serial port, executing step 611 in the case that the data is received via a serial port; waiting for receiving data and returning to step 610 in the case that the data is not received via a serial port.

In step 611, when all of data sent by the host is received, the data is stored into the first cache, the data stored in the first cache is verified and whether the data is verified successfully is determined, executing step 612 in the case that the data is verified successfully; returning to step 610 in the case that the data is not verified successfully.

The method for verification in the present embodiment is the same as the method for verification in step 606; details of the method will not be repeated herein.

In step 612, the data in the first cache is processed according to the serial port protocol, step 608 is returned to.

Figure 8:
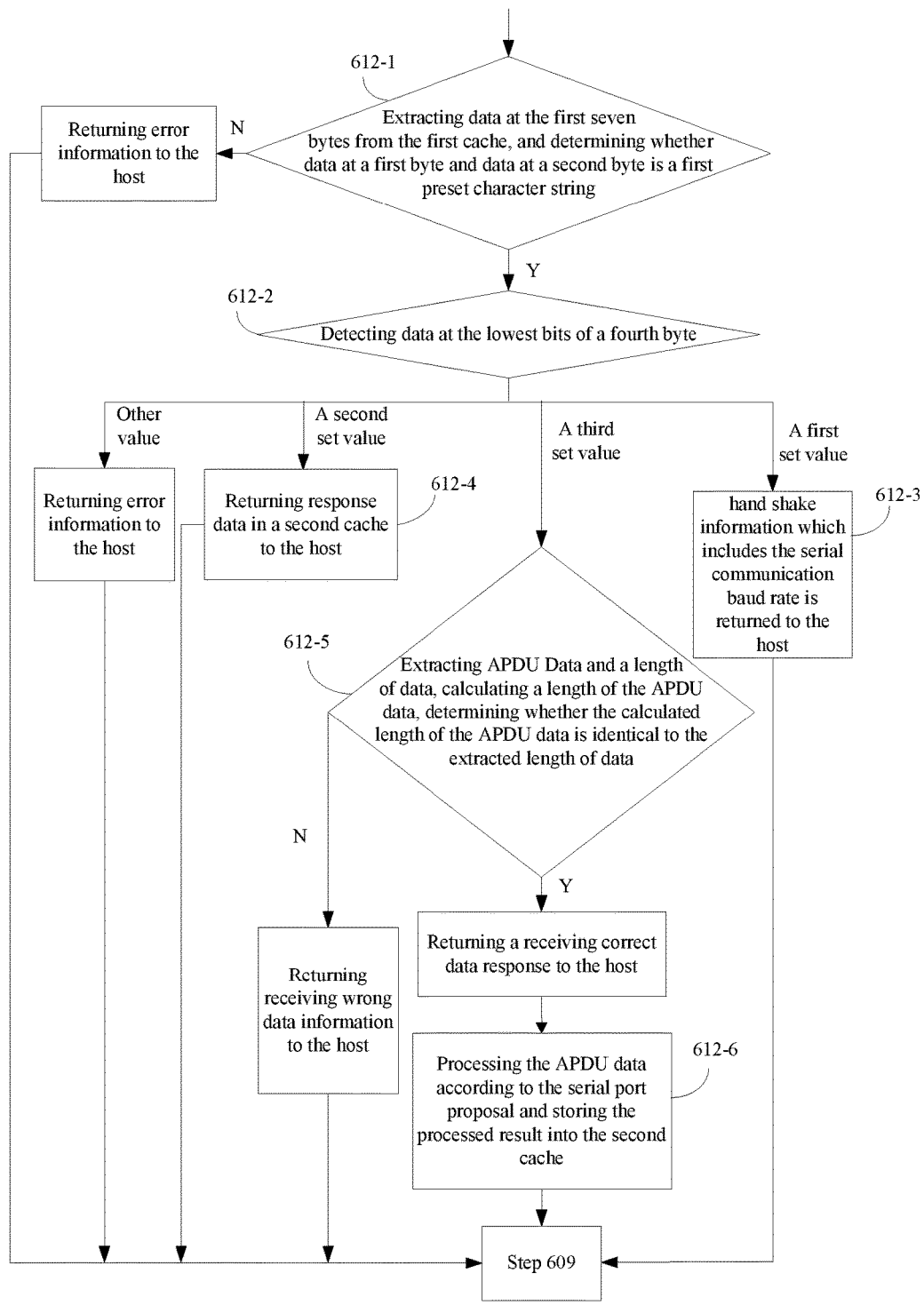
FIG. 8 is a flow diagram illustrating details of step 612 in Embodiment 2 of the present disclosure.

As shown in FIG. 8, in the present embodiment, step 612 includes step 612-1 to step 612-6.

In step 612-1, data at a first seven bytes is extracted from the first cache, it's determined that whether data at a first byte and data at a second byte is a first preset character string, step 612-2 is executed in the case that the data at the first byte and the second byte is the first preset character string; error information is returned to the host and step 609 is returned to in the case that the data at the first byte and the second byte is not the first preset character string.

In the present embodiment, the first preset character string may be 0xF5, 0x54.

In step 612-2, data at the lowest four bits of a fourth byte is detected, step 612-3 is executed in the case that the data is a first set value; step 612-4 is executed in the case that the data is a second set value; step 612-5 is executed in the case that the data is a third set value; error information is returned to the host and step 609 is returned to in the case that the data are other values.

In the present embodiment, the first set value, the second set value and the third set value are 0x02, 0x07 and 0x03 respectively, all of which are hexadecimal numbers.

In step 612-3, hand shake information which includes the serial communication baud rate is returned to the host, step 609 is returned to.

In step 612-4, response data in a second cache is returned to the host, step 609 is returned to.

In step 612-5, APDU data and a length of data is extracted from the first cache, a length of the APDU data is calculated, whether the calculated length of the APDU data is the same as the length of data extracted is determined, a receiving correct data response is returned to the host and step 612-6 is executed in the case that the calculated length of the APDU data is the same as the length of data extracted; receiving wrong data information is returned to the host and step 609 is returned to in the case that the calculated length of APDU data is not the same as the length of data extracted.

In step 612-6, the APDU data is processed in accordance with the serial port protocol and a processed result is stored into the second cache, step 609 is returned to.

In step 613, an instruction sent by the host is waited for, corresponding operation is performed according to the USB interface protocol when the instruction is received, step 613 is returned to after the operation is finished.

The implementation of step 613 in the present embodiment is the same as step 103 in Embodiment 1, it is not necessary to repeat herein.

Figure 9:
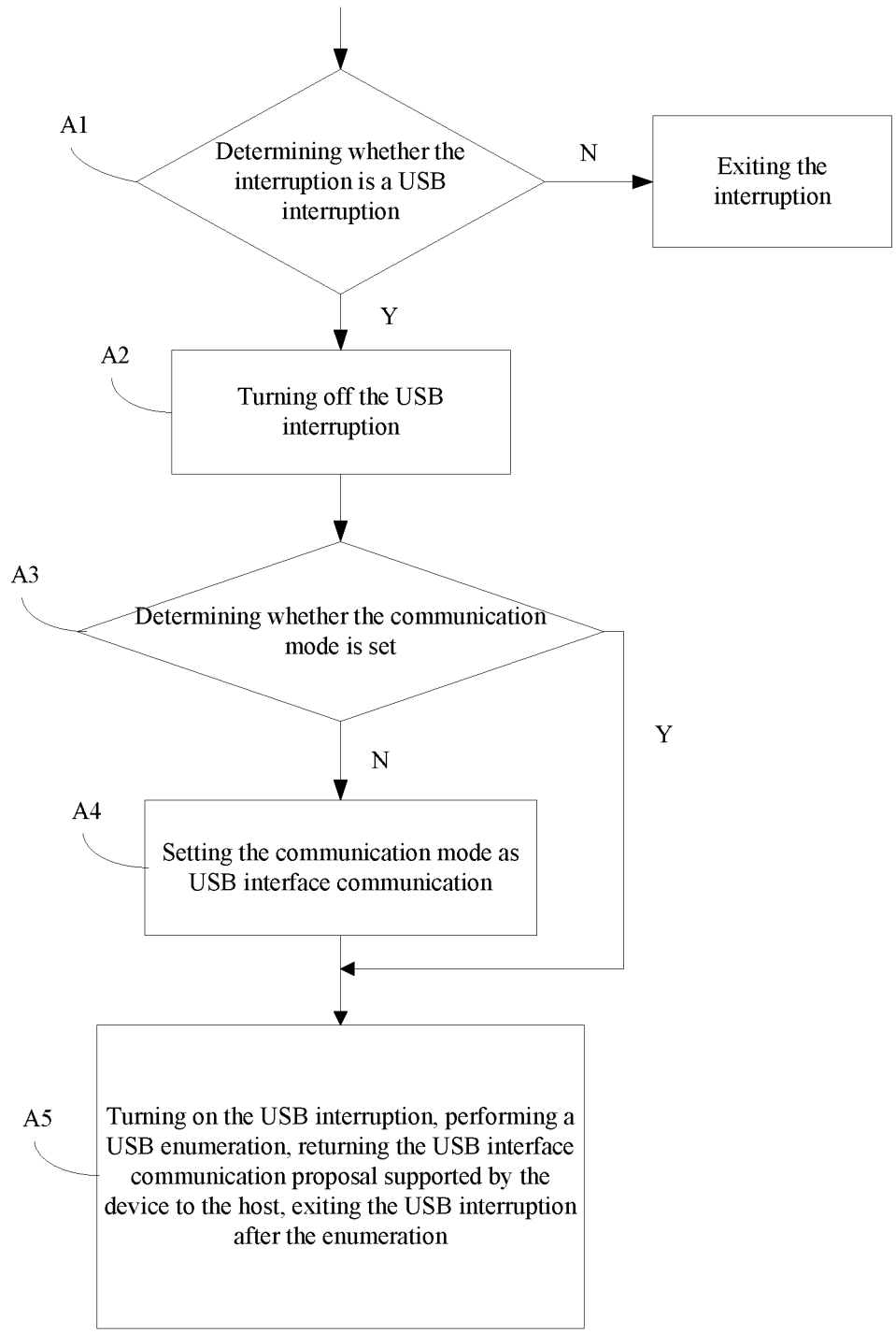
FIG. 9 is a flow diagram of processing when the interruption signal is received in accordance with Embodiment 2 of the present disclosure.

In the present embodiment, in the process of recognizing the communication mode, when an interruption signal is detected, the instruction is processed, as shown in FIG. 9, processing the instruction includes step A1 to step A5.

In step A1, whether the interruption is a USB interruption is determined, executing step A2 in the case that the interruption is a USB interruption; exiting the interruption in the case that the interruption is not a USB interruption.

In the present embodiment, it's determined that whether a value of a flag bit in an interrupt flag register is 1, the interruption is the USB interruption in the case that the value of the flag bit is 1; the interruption is not the USB interruption in the case that the value of the flag bit is not 1.

In step A2, the USB interruption is turned off.

Step A2 may include: setting the value of the flag bit in the interrupt flag register as 0.

In step A3, it's determined that whether the communication mode is set, executing step A5 in the case that the communication mode is set; executing step A4 in the case that the communication mode is not set.

In step A4, the communication mode is set as USB interface communication, step A5 is executed.

In the present embodiment, step A4 may include: setting the value of the communication identifier as 1.

In step A5, the USB interruption is turned on, a USB enumeration is implemented, the USB interface communication protocol supported by the device is returned to the host, the USB interruption exits after the enumeration is finished.

Returning the USB interface communication protocol supported by the device to the host includes: returning a value of an IO communication identifier to the host. The device supports the CCID protocol in the case that the value of the IO communication identifier is the first preset value; the device support the HID protocol in the case that the value of the IO communication identifier is the second preset value; the device supports the SCSI protocol in the case that the value of the IO communication identifier is the third preset value.

In the present embodiment, it is predefined that the USB interface communication protocol supported by the device may be one type, two types or three types protocols of the CCID protocol, the HID protocol and the SCSI protocol.

When two or three types of the CCID protocol, the HID protocol and the SCSI protocol are supported by the device, step 613 includes step 613-41 to step 613-62.

In step 613-41, the value of the IO communication identifier is detected, step 613-42 is executed in the case that the value of the IO communication identifier is a first preset value; step 613-47 is executed in the case that the value of the IO communication identifier is a second preset value; step 613-54 is executed in the case that the value of the IO communication identifier is a third preset value.

Optionally, the first preset value is 1, the second preset value is 3, and the third preset value is 5.

In step 613-42, an instruction sent by the host is waited for, when it is received via the USB interface, the instruction is stored into the first cache, and the instruction stored in the first cache is parsed according to the CCID protocol.

Step 613-43, data at a first byte in the parsed result is determined, step 613-44 is executed in the case that the data at the first byte is a first preset character; step 613-45 is executed in the case that the data at the first byte is a second preset character; step 613-46 is executed in the case that the data at the first byte are other values.

In step 613-44, the parsed result is processed correspondingly, the processed result is stored into the second cache, the parsed result is returned to the host, step 613-42 is returned to.

In step 613-45, APDU data in the parsed result is sent to a command layer to be processed, a processed result is stored into the second cache when the processed result is received, the processed result is returned to the host, step 613-42 is returned to.

In step 613-46, an information error response is organized and stored into the second cache, the information error response is returned to the host, step 613-42 is returned.

In step 613-47, an instruction sent by the host is waited for, when a Set up package of eight bytes is received via the USB interface, a state of a state machine is determined, step 613-49 is executed in the case that the state of the state machine is sending; step 613-48 is executed in the case that the state of the state machine is receiving.

In step 613-48, the Set up package is parsed according to the HID protocol, data at a first two bytes in the parsed result is detected, step 613-51 is executed in the case that the data at the first two bytes is a first character string, step 613-47 is returned to in the case that the data at the first two bytes are other values.

In step 613-49, the Set up package is parsed according to HID protocol, the data at the first two bytes in the parsed result is detected, step 613-51 is executed in the case that the data at the first two bytes is the first character string; step 613-50 is executed in the case that the data at the first two bytes is a second character string, step 613-47 is returned to in the case that the data at the first two bytes are other values.

In step 613-50, response data in the second cache is returned to the host, the state of the state machine is set as receiving, step 613-47 is returned to.

In step 613-51, the parsed result of the Set up package is stored into the first cache, whether the instruction is a reset instruction is determined according to the parsed result, step 613-52 is executed in the case that the instruction is a reset instruction; step 613-53 is executed in the case that the instruction is not a reset instruction.

In step 613-52, response data which includes a reset parameter is set and stored into the second cache, the state of the state machine is set as sending, and step 613-47 is returned to.

In step 613-53, the parsed result is sent to the command layer and is processed, a processed result is received and stored into the second cache, the state of the state machine is set as sending, step 613-47 is returned to.

In step 613-54, an instruction sent by the host is waited for, when the instruction is received via the USB interface, the instruction is parsed in accordance with the SCSI protocol.

In step 613-55, whether the received instruction is a valid SCSI instruction is determined according to the parsed result, executing step 613-56 in the case that the received instruction is a valid SCSI instruction; returning to step 613-54 in the case that the received instruction is not a valid SCSI instruction.

In step 613-56, whether the received instruction is a standard SCSI instruction is determined according to the parsed result, executing step 613-57 in the case that the received instruction is a standard SCSI instruction; executing step 613-58 in the case that the received instruction is not a standard SCSI instruction.

In step 613-57, corresponding operation is performed according to the standard SCSI instruction, an operated result is returned to the host, and step 613-54 is returned to.

In step 613-58, a state of data transfer is determined, step 613-59 is executed in the case that the state of data transfer is sending; step 613-60 is executed in the case that the state of data transfer is receiving.

In step 613-59, response data in the second cache is returned to the host, step 613-54 is returned to;

In step 613-60, the parsed result is stored into the first cache, whether the received instruction is a reset instruction is determined according to the parsed result, step 613-61 is executed in the case that the received instruction is a reset instruction; step 613-62 is executed in the case that the received instruction is not a reset instruction.

In step 613-61, response data which includes a reset parameter is set and stored into the second cache, the state of data transfer is set as sending, and step 613-54 is returned to.

In step 613-62, the parsed result is sent to the command layer and is processed, a processed result is received and stored into the second cache, step 613-54 is returned to.

Embodiment 3

Figure 10:
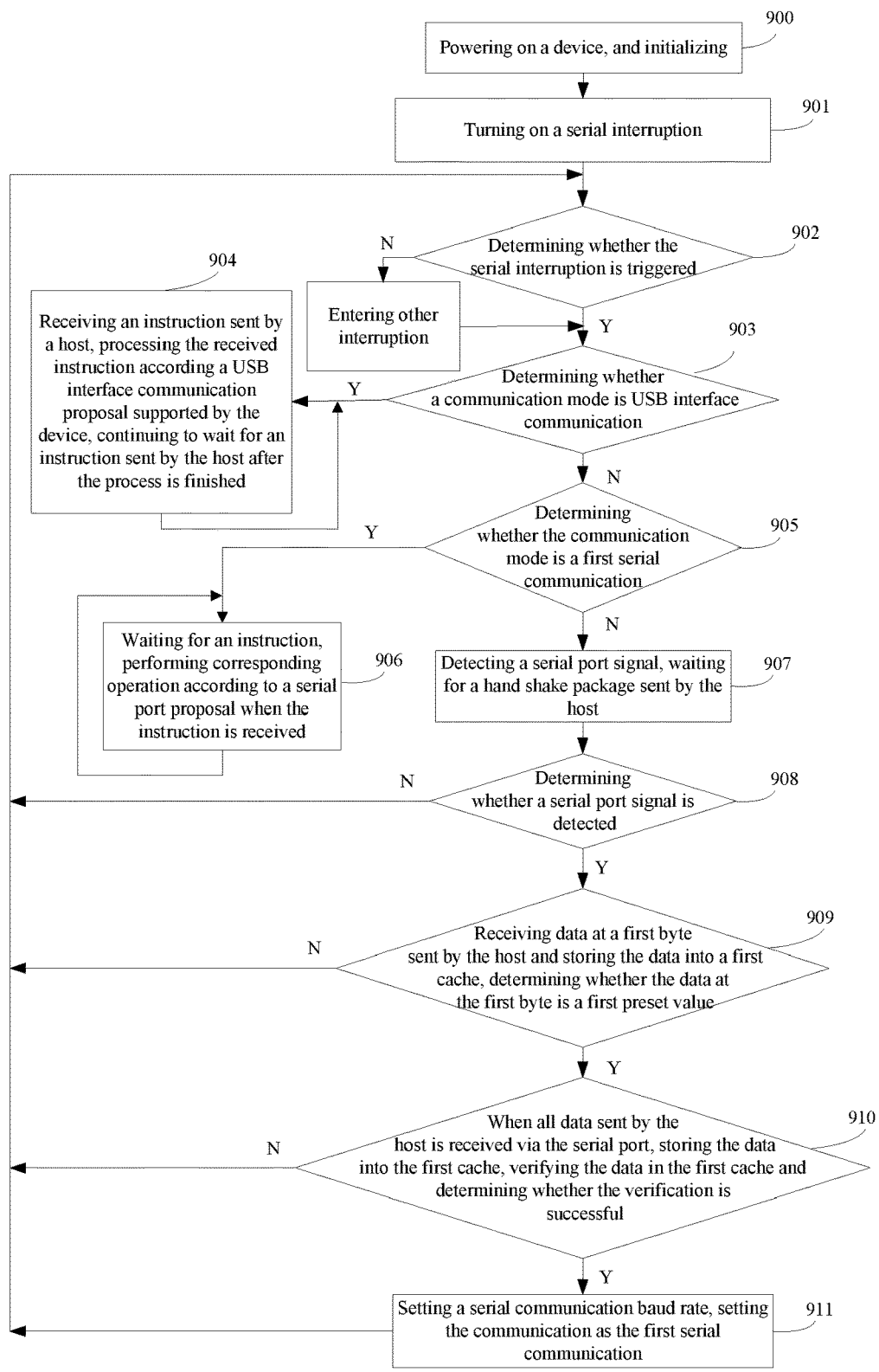
FIG. 10 is a flow diagram illustrating a method for recognizing a communication mode in accordance with Embodiment 3 of the present disclosure.

Embodiment 3 of the present disclosure provides a method for recognizing a communication mode, as shown in FIG. 10, the method includes step 900 to step 911.

In step 900, a device is powered on and initialized.

In the present embodiment, the device being initialized includes: setting a value of a communication identifier as 0.

In the present embodiment, a default communication mode after the device is powered on is set as serial communication.

In step 901, a serial port interruption, a USB interruption, a clock interruption and a timer are turned on.

In step 902, whether the serial port interruption is triggered is determined, step 903 is executed in the case that the serial port interruption is triggered; another interruption is entered and step 903 is executed after the interruption is exited in the case that the serial port interruption is not triggered.

In the present embodiment, the process of another interruption being entered includes step D1 to step D4.

In step D1, whether the USB interruption is triggered is determined, step A2 is executed in the case that the USB interruption is triggered; the interruption exits in the case that the USB interruption is not triggered.

In step D2, the USB interruption is turned off, whether a Set up package is received via an endpoint 0 is determined, step D3 is executed in the case that the Set up package is received via the endpoint 0; the USB interruption is turned on and step D4 is executed in the case that the Set up package is not received via the endpoint 0.

In step D3, the USB interruption is turned on, a USB enumeration is implemented, the USB interface communication protocol supported by the device is returned to the host, step D4 is executed.

In the present embodiment, it is predefined that the USB interface communication protocol supported by the device may include one type of or multiple types of the CCID protocol, the HID protocol or the SCSI protocol, each type of protocol corresponds to a different value of the IO communication identifier. The device supports the CCID protocol in the case that the value of the IO communication identifier is a first preset value; the device supports the HID protocol in the case that the value of the IO communication identifier is a second preset value; the device support the SCSI protocol in the case that the value of the IO communication identifier is a third preset value. The USB interface communication protocol supported by the device being returned to the host may include: sending the value of the IO communication identifier to the host. Optionally, the device supports may only one type of protocols in the present embodiment for instance.

In step D4, the communication mode is set as the USB interface communication, the USB interruption is exited.

That the communication mode being set as USB interface communication includes: setting a value of a communication identifier as 1.

In step 903, whether the communication mode is the USB interface communication is determined, executing step 904 in the case that the communication mode is the USB interface communication; returning to step 905 in the case that the communication mode is not the USB interface communication;

In the present embodiment, step 903 specifically includes: determining whether the value of the communication identifier is 1, the communication mode being the USB interface communication in the case that the value of the communication identifier is 1; the communication mode not being the USB interface communication in the case that the value of the communication identifier is not 1.

In step 904, an instruction sent by the host is received, the received instruction is processed in accordance with the USB interface communication protocol supported by the device, an instruction sent by the host is continued to be waited for, and step 904 is returned to.

In the present embodiment, the implementation of processing the received instruction according to the USB interface communication protocol supported by the host is the same as the implementation in step 103 in Embodiment 1, it is not necessary to repeat herein.

In step 905, whether the communication mode is a first serial communication is determined, executing step 906 in the case that the communication mode is the first serial port; executing step 907 in the case that the communication mode is not the first serial port.

In step 905 may include: determining whether the value of the communication identifier is 4, the communication mode being the first serial communication in the case that the value of the communication identifier is 4; the communication mode not being the first serial communication in the case that the value of the communication identifier is not 4.

In step 906, an instruction sent by the host is waited for, when the instruction is received, corresponding operation is performed in accordance with the serial port protocol, step 906 is returned to after the operation is finished.

Figure 11:
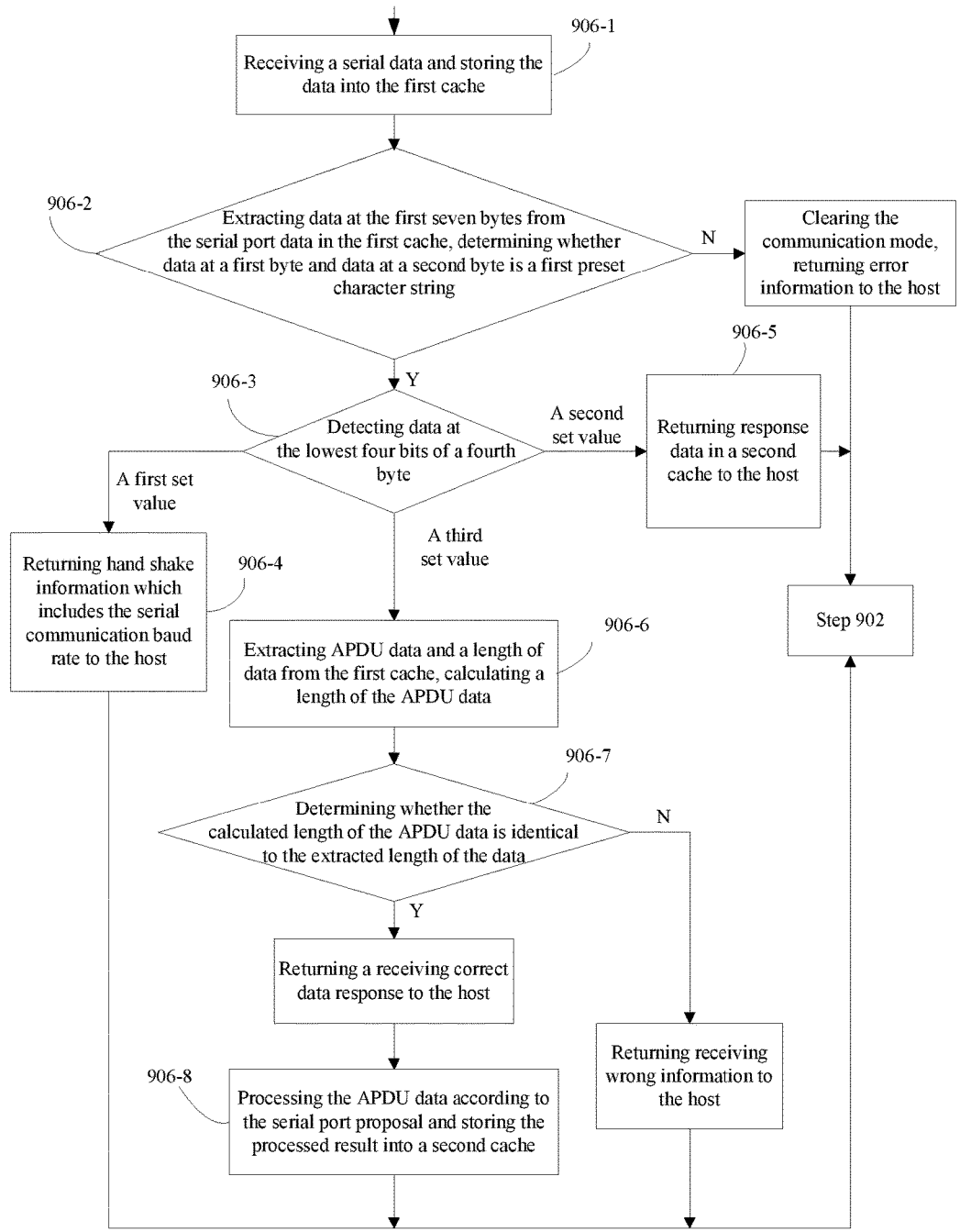
FIG. 11 is a flow diagram illustrating implementation of processing the received data in Embodiment 3 of the present disclosure.

As shown in FIG. 11, the received data being correspondingly processed according to the serial communication protocol includes step 906-1 to step 906-8.

In step 906-1, serial data is received and stored into the first cache.

In step 906-2, data at the first seven bytes is extracted from the first cache, and whether data at a first byte and at a second byte is a first preset character string is determined, step 906-3 is executed in the case that the data at the first byte and at the second byte is the first preset character string; the communication mode is cleared error information is returned to the host, and step 902 is returned to in the case that the data at the first byte and the second byte is not the first preset character string.

In the present embodiment, the first preset character string may include 0xF5, 0x54.

In step 906-3, data at the lowest four bits of a fourth byte is detected, step 906-4 is executed in the case that the data is a first set value; step 906-5 is executed in the case that the data is a second set value; step 906-6 is executed in the case that the data is a third set value.

In the present embodiment, the first set value is 0x02; the second set value is 0x07; and the third set value is 0x03.

In step 906-3, the error information is returned to the host and step 902 is returned to in the case that the data at the lowest four bits of the fourth byte are other values.

In step 906-4, hand shake information which includes a serial communication baud rate is returned to the host, step 902 is returned to.

In step 906-5, response data in the second cache is returned to the host, step 902 is returned to.

In step 906-6, APDU data and a length of data are extracted from the first cache; a length of the APDU data is calculated.

In step 906-7, determine whether the calculated length of the APDU data is the same as the length of data extracted, a receiving correct data response is returned to the host and step 906-8 is executed in the case that the calculated length of the APDU data is the same as the length of data extracted; receiving wrong data information is returned to the host and step 902 is returned to in the case that the calculated length of the APDU data is not the same as the length of data extracted;

In step 906-8, the APDU data is processed in accordance with the serial port protocol, and a processed result is stored into the second cache, step 902 is returned to.

In step 907, a serial port signal is detected; a hand shake data package sent by the host is waited for.

In step 908, it's determined that whether the serial port signal is detected, step 909 is executed in the case that the serial port signal is detected; step 902 is returned to in the case that the serial port signal is not detected.

In step 909, data at a first byte sent by the host is received and stored into the first cache, whether the data at the first byte is the first preset value is determined, step 910 is executed in the case that the data at the first byte is the first preset value; step 902 is returned to in the case that the data at the first byte is not the first preset value.

In the present embodiment, the first preset value may be 0x0F.

In step 910, when all of data sent by the host is received via the serial port, the data is stored into the first cache, the data in the first cache is verified and whether the verification is successful is determined, step 911 is executed in the case that the verification is successful; step 902 is returned to in the case that the verification is not successful.

In step 911, the serial communication baud rate is set, the communication mode is set as the first serial communication, step 902 is returned to.

In the present embodiment, that the communication mode being set as the first serial communication may include: setting the value of the communication identifier as 4.

In the present embodiment, a communication baud rate is set by the device, and the communication baud rate is sent to the host when an instruction of obtaining a baud rate sent by the host, and then the device communicates with the host via the baud rate.

In the present embodiment, it is may be predefined that the USB interface communication protocol supported by the device includes at least two types of the CCID protocol, the HID protocol or the SCSI protocol, where, the implementation is the same as that in Embodiment 2, it is unnecessary to repeat herein.

The method of the present disclosure can not only be applied in present products, but also be applied in serial port products of old edition, in this way the method could improve compatibility and inheritance of products so as to avoid huge expenditure because of weeding out products of old edition.

While preferred embodiments of the present disclosure have been shown and described herein, it will be obvious those skilled in the art that such embodiments are provided by way of example only. Numerous variations, changes, and substitutions will now occur to those skilled in the art without departing from the invention. It is intended that the following claims defined the scope of the invention and that method and structures within the scope of these claims and their equivalents be covered thereby.

What is claimed is:

1. A method for recognizing a communication mode, comprising:
    step S1 comprising powering on a device, initializing, turning on an interruption and a timer, and the timer starting timing;
    entering a clock interruption when a preset value is reached by timing of the timer, wherein the clock interruption comprises: turning off the timer, setting a time-out flag, turning on the timer, and exiting the clock interruption;
    continuing to Step B1 when other interruption signals are detected, continuing to step S2 when no other interruption signals are detected;
    step B1 comprising determining a type of an interruption, continuing to step B2 in the case that the interruption is a Universal Serial Bus (USB) interruption; continuing to step B6 in the case that the interruption is a serial port interruption;
    step B2 comprising turning off the USB interruption;
    step B3 comprising determining whether a communication mode is set, executing step B5 in the case that the communication mode is set; executing step B4 in the case that the communication mode is not set;
    step B4 comprising setting the communication mode as USB interface communication, executing step B5;
    step B5 comprising turning on the USB interruption, carrying out a USB enumeration, returning a USB interface communication protocol supported by the device to a host, exiting the USB interruption and continuing to step S2 after the USB enumeration is finished;
    step B6 comprising turning off the serial port interruption;
    step B7 comprising determining whether the communication mode is set, turning on the serial port interruption and exiting the serial port interruption and continuing to step S2 in the case that the communication mode is set; executing step B8 in the case that the communication mode is not set;
    step B8 comprising setting the communication mode as serial communication according to a first data package which is received, turning on the serial port interruption, exiting the serial port interruption and continuing to step S2;
    step S2 comprising detecting a type of the communication mode, turning off the timer and executing step S3 in the case that the communication mode is the USB interface communication;
    turning off the timer and executing step S6 in the case that the communication mode is the serial communication;
    executing step S4 in the case that the communication mode is not set;
    step S3 comprising waiting for an instruction sent by the host, when the instruction is received, processing an operation correspondingly according to the USB interface communication protocol supported by the device, and returning to step S3 after the operation is finished;
    step S4 comprising determining whether the time-out flag is set, executing step S5 in the case that the time-out flag is set; returning to step S2 in the case that the time-out flag is not set;
    step S5 comprising setting the communication mode as the serial communication, turning off the timer, resetting the time-out flag, executing step S6;
    step S6 comprising waiting for an instruction sent by the host, when the instruction is received, processing an operation corresponding to the instruction according to a serial port protocol, and returning to step S6 after the operation is finished.

2. The method of claim 1, further comprising: predefining, by the device, USB interface communication protocols supported by the device, wherein the protocols comprise an Integrated Circuits Cards Interface Device (CCID) protocol, a Human Interface Device (HID) protocol or a Small Computer System Interface (SCSI) protocol;
    wherein returning the USB interface communication protocol supported by the device to the host in step B5 comprises:
    sending, by the device, a value of an input/output (IO) communication identifier to the host.

3. The method of claim 2, wherein,
    in the case that the value of the IO communication identifier is a first preset value, step S3 comprises:
    step S3-11 comprising waiting for an instruction sent by the host, when the instruction is received via a USB interface, storing the instruction in a first cache, parsing the instruction in the first cache according to the CCID protocol:
    step S3-12 comprising determining data at a first byte in the parsed result, executing step S3-13 in the case that the data at the first byte is a first preset character; executing step S3-14 in the case that the data at the first byte is a second preset character, executing step S3-15 in the case that the data of the first byte is other value;
    step S3-13 comprising carrying out a corresponding process to the parsed result, storing a processed result into a second cache, returning the processed result to the host, returning to step S3-11;
    step S3-14 comprising sending application protocol data unit (APDU) data in the parsed result to a command layer to be processed, storing a processed result into the second cache when the processed result is received, returning the processed result to the host, returning to step S3-11;
    step S3-15 comprising organizing an information error response and storing the information error response into the second cache, returning the information error response to the host, returning to step S3-11;

or in the case that the value of the IO communication identifier is a second preset value, step S3 comprises:

step S3-21, comprising waiting for an instruction sent by the host, determining a state of a state machine when a Set up package of eight bytes is received via the USB interface, executing step S3-23 in the case that the state of the state machine is sending; executing step S3-22 in the case that the state of the state machine is receiving;

step S3-22 comprising parsing the Set up package according to the HID protocol, detecting data at the first two bytes of the parsed result, executing step S3-25 in the case that the data at the first two bytes of the parsed result is a first character string; returning to step S3-21 in the case that the data at the first two bytes is other value;

step S3-23 comprising parsing the Set up package according to the HID protocol, detecting data at the first two bytes of the parsed result, executing step S3-25 in the case that the data at the first two bytes of the parsed result is the first character string; executing step S3-24 in the case that the data at the first two bytes of the parsed result is a second character string; returning to step S3-21 in the case that the data at the first two bytes of the parsed result is other value;

step S3-24 comprising returning response data in the second cache to the host, setting the state of the state machine as receiving, returning to step S3-21;

step S3-25 comprising storing the parsed result of the Set up package into the first cache, determining whether the instruction is a hot reset instruction according to the parsed result, executing step S3-26 in the case that the instruction is a hot reset instruction; executing step S3-27 in the case that the instruction is not a hot reset instruction;

step S3-26 comprising setting a response data which comprises a reset parameter, and storing the response data into the second cache, setting the state of the state machine as sending, returning to step S3-21;

step S3-27 comprising sending the parsed result to the command layer to be processed, receiving a processed result and storing the processed result into the second cache, setting the state of the state machine as sending, returning to step S3-21;

or in the case that the value of the IO communication identifier is a third preset value, step S3 comprises:

step S3-31 comprising waiting for an instruction sent by the host, parsing the instruction according to the SCSI protocol when the instruction is received via the USB interface;

step S3-32 comprising determining whether the received instruction is a valid SCSI instruction in accordance with the parsed result, executing step S3-33 in the case that the instruction is a valid SCSI instruction; executing step S3-31 in the case that the instruction is not a valid SCSI instruction;

step S3-33 comprising determining whether the received instruction is a standard SCSI instruction in accordance with the parsed result, executing step S3-34 in the case that the received instruction is a standard SCSI instruction; executing step S3-35 in the case that the received instruction is not a standard SCSI instruction;

step S3-34 comprising carrying out a corresponding process according to the standard SCSI instruction, and returning a processed result to the host, returning to step S3-31;

step S3-35 comprising determining a state of data transfer, executing step S3-36 in the case that the state of data transfer is sending; executing step S3-37 in the case that the state of data transfer is receiving;

step S3-36 comprising returning response data in the second cache to the host, returning to step S3-31;

step S3-37 comprising storing the parsed result into the first cache, and determining whether the received instruction is a hot reset instruction according to the parsed result, executing step S3-38 in the case that the instruction is a hot reset instruction; executing step S3-39 in the case that the instruction is not a hot reset instruction;

step S3-38 comprising setting the response data which comprises a reset parameter, and storing the response data into the second cache, setting the state of data transfer as sending, returning to step S3-31;

step S3-39 comprising sending the parsed result to the command layer to be processed, receiving a processed result and storing the processed result into the second cache, returning to step S3-31.

4. The method of claim 1, further comprising:
predefining, by the device, USB interface communication protocols supported by the device, wherein the USB interface communication protocols comprise at least two types of protocols of an Integrated Circuits Cards Interface (CCID) protocol, a Human Interface Device (HID) protocol and a Small Computer System Interface (SCSI) protocol;
wherein returning the USB interface communication protocol supported by the device to the host in step B5 comprises: sending, by the device, an input/output (IO communication identifier to the host.

5. The method of claim 4, wherein, step S3 comprises:
step S3-41 comprising, detecting a value of the IO communication identifier, executing step S3-42 in the case that the value of the IO communication identifier is a first preset value; executing step S3-47 in the case that the value of the IO communication identifier is a second preset value;
executing step S3-54 in the case that the value of the IO communication identifier is a third preset value;
step S3-42 comprising waiting for an instruction sent by the host, storing the instruction into the first cache when the instruction is received via the USB interface, parsing the instruction in the first cache according to the CCID protocol;
step S3-43 comprising determining data at the first byte in a parsed result, executing step S3-44 in the case that the data at the first byte in the parsed result is a first preset character, executing step S3-45 in the case that the data at the first byte in the parsed result is a second preset character; executing step S3-46 in the case that the data at the first byte in the parsed result are other values;
step S3-44 comprising carrying out a corresponding process on the parsed result, storing a processed result into a second cache, returning the processed result to the host, returning to step S3-42;
step S3-45 comprising sending application protocol data unit (APDU) data in the parsed result to a command layer to be processed, storing the parsed result into the second cache when the processed result is received, returning the processed result to the host, returning to step S3-42;
step S3-46 comprising organizing information error response and storing the information error response into the second cache, returning the information error response to the host, returning to step S3-42;
step S3-47 comprising waiting for an instruction sent by the host, determining a state of the state machine when a Set up package of eight bytes is received via the USB interface, executing step S3-49 in the case that the state of the state machine is sending; executing step S3-48 in the case that the state of the state machine is receiving;

step S3-48 comprising parsing the Set up package according to the HID protocol, detecting data at the first two bytes in the parsed result, executing step S3-51 in the case that the data at the first two bytes is a first character string; returning to step S3-47 in the case that the data at the first two bytes in the parsed result are other values;

step S3-49 comprising paring the Set up package according to the HID protocol, detecting the data at the first two bytes in the parsed result, executing step S3-51 in the case that the data at the first two bytes in the parsed result is the first character string; executing step S3-50 in the case that the data at the first two bytes in the parsed result is a second character string; returning to step S3-47 in the case that the data at the first two bytes in the parsed result are other values;

step S3-50 comprising returning response data in the second cache to the host, setting the state of the state machine as receiving, returning to step S3-47;

step S3-51 comprising storing the parsed result of the Set up package into the first cache, determining whether the instruction is a hot reset instruction according to the parsed result, executing step S3-52 in the case that the instruction is a hot reset instruction; executing S3-53 in the case that the instruction is not a hot reset instruction;

step S3-52 comprising setting a response data which comprises a reset parameter, storing the response into the second cache, setting the state of the state machine as sending, returning to step S3-47;

step S3-53 comprising sending the parsed result to a command layer to be processed, receiving a processed result and storing the processed result into the second cache, setting the state of the state machine as sending, returning to step S3-47;

step S3-54 comprising waiting for an instruction sent by the host, parsing the instruction according to the SCSI protocol when the instruction is received via the USB interface;

step S3-55 comprising determining whether the received instruction is a valid SCSI instruction according to the parsed result, executing step S3-56 in the case that the received instruction is a valid SCSI instruction; returning to step S3-54 in the case that the received instruction is not a valid SCSI instruction;

step S3-56 comprising determining whether the received instruction is a standard SCSI instruction in accordance with the parsed result, executing step S3-57 in the case that the instruction is a standard SCSI instruction; executing step S3-58 in the case that the instruction is not a standard SCSI instruction;

step S3-57 comprising carrying out a corresponding process in accordance with the standard SCSI instruction, returning a processed result to the host, returning to step S3-54;

step S3-58 comprising determining a state of data transfer, executing step S3-59 in the case that the state is sending; executing step S3-60 in the case that the state is receiving;

step S3-59 comprising returning response data in the second cache to the host, returning to step S3-54;

step S3-60 comprising storing the parsed result into the first cache, determining whether the received instruction is a hot reset instruction in accordance with the parsed result, executing step S3-61 in the case that the received instruction is a hot reset instruction; executing step S3-62 in the case that the received instruction is not a hot reset instruction;

step S3-61 comprising setting response data which comprises a reset parameter, and storing the response data into the second cache, setting the state of data transfer as sending, returning to step S3-54;

step S3-62 comprising sending the parsed result to the command layer to be processed, receiving the processed result and storing the processed result into the second cache, returning to step S3-54.

6. The method of claim 1, wherein, step S6 comprises:

step S6-1 comprising when the instruction is received via a serial port, storing the instruction into a first cache, parsing the instruction stored in the first cache in accordance with the serial port protocol and determining whether data at the first byte of the parsed result is first preset data, executing step S6-2 in the case that the data is the first preset data; returning to step S6-1 in the case that the data is not the first preset data;

step S6-2 comprising determining whether data at a third byte in the parsed result is second preset data, executing step S6-3 in the case that the data is the second preset data; executing step S6-4 in the case that the data is not the second preset data;

step S6-3 comprising processing the parsed result and returning a processed result to the host, returning to step S6-1;

step S6-4 comprising detecting data at a fourth byte in the parsed result, executing step S6-5 in the case that the data is a third preset data; executing step S6-6 in the case that the data is a fourth preset data; returning to step S6-1 in the case that the data are other values;

step S6-5 comprising outputting low-battery information, entering a crash state, end;

step S6-6 comprising setting response data, and storing the response data into the second cache, returning to step S6-1; wherein, the response data comprises a communication baud rate between the device and the host and a length of transmitting data.

7. The method of claim 1, wherein,
the initialization comprises:
setting a value of the communication identifier as 0;
detecting a type of the communication mode comprises:
detecting the value of the communication identifier, current communication mode is USB interface communication in the case that the value of the communication identifier is 1; the current communication mode is serial communication in the case that the value of the communication identifier is 2; the communication mode is not set in the case that the value of the communication identifier is 0;
setting the communication mode as serial communication comprises: setting the value of the communication identifier as 2;
setting the communication mode as USB interface communication comprises: setting the value of the communication identifier as 1.

8. A method for recognizing a communication mode, comprising:
step P1 comprising powering on a device, initializing, and turning on an interruption;
entering an interruption process when an interruption signal is detected, wherein the interruption process further comprises:
step A1 comprising determining whether the interruption is a Universal Serial Bus (USB) interruption, executing step A2 in the case that the interruption is a USB interruption; exiting the interruption and continuing to step P2 in the case that the interruption is not a USB interruption;

step A2 comprising turning off the USB interruption;

step A3 comprising determining whether a communication mode is set, executing step A5 in the case that the communication mode is set; executing step A4 in the case that the communication mode is not set;

step A4 comprising setting the communication mode as USB interface communication, executing step A5;

step A5 comprising turning on the USB interruption, implementing a USB enumeration, returning a USB interface communication protocol supported by the device to a host, exiting the USB interruption after the enumeration is finished;

step P2 comprising determining whether the communication mode is USB interface communication, executing step P13 in the case that the communication mode is USB interface communication; executing step P3 in the case that the communication mode is not USB interface communication;

step P3 comprising determining whether data is received via a serial port, executing step P4 in the case that the data is received via a serial port; executing step P2 in the case that the data is not received via a serial port;

step P4 comprising storing received data into a first cache, determining whether data at a first byte stored in the first cache is a first preset value, executing step P6 in the case that the data is the first preset value; executing step P5 in the case that the data is not the first preset value;

step P5 comprising determining whether the communication mode is USB interface communication, executing step P13 in the case that the communication mode is USB interface communication; returning to step P4 in the case that the communication mode is not a USB interface communication;

step P6 comprising storing the data into the first cache after all data sent by the host is received via the serial port, verifying the data stored in the first cache and determining whether the data is verified successfully, executing step P7 in the case that the data is verified successfully; returning to step P3 in the case that the data is verified unsuccessfully;

step P7 comprising setting a serial communication baud rate, setting a communication mode as first serial communication and continuing to step P10;

step P9 comprising setting the communication mode as second serial communication, executing step P12;

step P10 comprising determining whether data is received via a serial port, executing step P11 in the case that the data is received via the serial port; waiting for receiving the data and returning to step P10 in the case that the data is not received via the serial port;

step P11 comprising storing the data into the first cache when all data sent by the host is received, verifying the data stored in the first cache and determining whether the data is verified successfully, executing step P12 in the case that the data is verified successfully; returning to step P10 in the case that the data is not verified successfully;

step P12 comprising processing the data in the first cache according to a serial port protocol, returning to step P12 when the process is finished;

step P13 comprising waiting for an instruction sent by the host, carrying out a corresponding process according to a USB interface protocol supported by the device when the instruction is received, returning to step P13 when the process is finished.

9. The method of claim 8, wherein, the initialization comprises: setting a value of a communication identifier as 0;

determining whether the communication mode is USB interface communication comprises:

determining whether the value of the communication identifier is 1, the communication mode is the USB interface communication in the case that the value of the communication identifier is 1;

the communication mode is not the USB interface communication in the case that the value of the communication identifier is not 1;

setting the communication mode as the first serial communication comprises: setting the value of the communication identifier as 4;

determining whether the communication mode is the first serial communication comprises:

determining whether the value of the communication identifier is 4, the communication mode is the first serial communication in the case that the value of the communication identifier is 4; the communication mode is not the first serial communication in the case that the value of the communication identifier is not 4;

setting the communication mode as the second serial communication comprises: setting the value of the communication identifier as 2.

10. The method of claim 8, wherein, step P12 comprises:

step P12-1 comprising extracting data at first seven bytes in the first cache, determining whether data at a first byte and data at a second byte is a first preset character string, executing step P12-2 in the case that the data at the first byte and the data at the second byte is the first preset character string; returning an error information to the host and returning to step P9 in the case that the data at the first byte and the data at the second byte is not the first preset character string;

step P12-2 comprising detecting data at the lowest four bits of a fourth byte, executing step P12-3 in the case that the data at the lowest four bits of the fourth byte is a first set value; executing step P12-4 in the case that the data at the lowest four bits of the fourth byte is a second set value;

executing step P12-5 in the case that the data at the lowest four bits of the fourth byte is a third set value; returning an error information to the host and returning to step P9 in the case that the data at the lowest four bits of the fourth byte are other values;

step P12-3 comprising returning hand shake information which comprises the serial communication baud rate to the host, returning to step P9;

step P12-4 comprising returning response data in a second cache to the host, returning to step P9;

step P12-5 comprising extracting application protocol data unit (APDU) data and a length of data from the first cache, calculating a length of the APDU data, determining whether the length of the APDU data is the same as the length of the data extracted, returning a receiving correct data response to the host and executing step P12-6 in the case that the length of the APDU data is the same as the length of the data extracted; returning a receiving wrong data information to the host and returning to step P9 in the case that the length of the APDU data is not the same as the length of the data extracted;

step P12-6 comprising processing the APDU data in accordance with a serial port protocol and storing a processed result into the second cache, returning to step P9.

11. The method of claim 8, further comprising:
predefining, by the device, the USB interface communication protocol supported by the device, wherein the USB interface communication protocol supported by the device comprises an Integrated Circuits Cards Interface Device (CCID) protocol, a Human Interface Device (HID) protocol or a Small Computer System Interface (SCSI) protocol;
wherein returning the USB interface communication protocol supported by the device to the host in step A5 comprises: sending, by the device, a value of an input/output (IO) communication identifier to the host.

12. The method of claim 1, wherein:
in the case that a value of the IO communication identifier is the first preset value, step P13 comprises:
step P13-11 comprising waiting for an instruction sent by the host, storing the instruction into the first cache when the instruction is received via the USB interface, parsing the instruction stored in the first cache in accordance with the CCID protocol;
step P13-12 comprising determining data at a first byte in the parsed result, executing step P13-13 in the case that the data at the first byte is a first preset character; executing step P13-14 in the case that the data at the first byte is a second preset character; executing step P13-15 in the case that the data at the first byte are other characters;
step P13-13 comprising carrying out a corresponding process to the parsed result, storing a processed result into the second cache, returning the parsed result to the host, returning to step P13-11;
step P13-14 comprising sending application protocol data unit (APDU) data in the parsed result to a command layer to be processed, storing the processed result into the second cache when the processed result is received, returning the processed result to the host, returning to step P13-11;
step P13-15 comprising organizing an information error response and storing the information error response into the second cache, returning the information error response to the host, returning to step P13-11;
or
in the case that the value of the IO communication identifier is a second preset value, step P13 comprises:
step P13-21 comprising waiting for an instruction sent by the host, determining a state of a state machine when a Set up package of eight bytes is received via a USB interface, executing step P13-23 in the case that the state of the state machine is sending; executing step P13-22 in the case that the state of the state machine is receiving;
step P13-22 comprising parsing the Set up package according to the HID protocol, and detecting data at the first two bytes in the parsed result, executing step P13-25 in the case that the data at first two bytes in the parsed result is a first character string, returning to step P13-21 in the case that the data at first two bytes in the parsed result are other values;
step P13-23 comprising parsing the Set up package according to the HID protocol and detecting data at the first two bytes in the parsed result, executing step P13-25 in the case that the data at the first two bytes in the parsed result is the first character string; executing step P13-24 in the case that the data at the first two bytes in the parsed result is a second character string; returning to step P13-21 in the case that the data are other values;
step P13-24 comprising returning response data in the second cache to the host, setting the state of the state machine as receiving, returning to step P13-21;
step P13-25 comprising storing the parsed result of the Set up package into the first cache, determining whether the instruction is a hot reset instruction according to the parsed result, executing step P13-26 in the case that the instruction is a hot reset instruction; executing step P13-27 in the case that the instruction is not a hot reset instruction;
step P13-26 comprising setting response data with a reset parameter, and storing the response data into the second cache, setting the state of the state machine as sending, returning to step P13-21;
step P13-27 comprising sending the parsed result to the command layer to be processed, receiving a processed result and storing the processed result into the second cache, setting the state of the state as sending, returning to step P13-21;
or
in the case that the value of the IO communication identifier is a third preset value, step P13 comprises:
step P13-31 comprising waiting for an instruction sent by the host, parsing the instruction according to the SCSI protocol when the instruction is received via the USB interface;
step P13-32 comprising determining whether the received instruction is a valid SCSI instruction according to the parsed result, executing step P13-33 in the case that the received instruction is a valid SCSI instruction; returning to step P13-31 in the case that the received instruction is not a valid SCSI instruction;
step P13-33 comprising determining whether the received instruction is a standard SCSI instruction according to the parsed result, executing step P13-34 in the case that the received instruction is a standard SCSI instruction; executing step P13-35 in the case that the received instruction is not a standard SCSI instruction;
step P13-34 comprising carrying out a corresponding process in accordance with the standard SCSI instruction, returning a processed result to the host, returning to step P13-31;
step P13-35 comprising determining a state of data transfer, executing step P13-36 in the case that the state is sending; executing step P13-37 in the case that the state is receiving;
step P13-36 comprising returning response data in the second cache to the host, returning to step P13-31;
step P13-37 comprising storing the parsed result into the first cache, determining whether the received instruction is a hot reset instruction in accordance with the parsed result, executing step P13-38 in the case that the received instruction is a hot reset instruction; executing step P13-39 in the case that the received instruction is not a hot reset instruction;
step P13-38 comprising setting response data with a reset parameter, and storing the response data into the second cache, setting the state of data transfer as sending, returning to step P13-31;
step P13-39 comprising sending the parsed result to the command layer to be processed, receiving a processed result and storing the processed result into the second cache, returning to step P13-31.

13. The method of claim 8, wherein, step P13 comprises:
step P13-41 comprising detecting a value of an input/output (IO communication identifier, executing step P13-42 in the case that the value of the IO communication identifier is the first preset value; executing step P13-47 in the case that the value of the IO communication identifier is a second preset value; executing step P13-54 in the case that the value of the IO communication identifier is a third preset value;
step P13-42 comprising waiting for an instruction sent by the host, storing the instruction into the first cache when the instruction is received via the USB interface, parsing the instruction stored in the first cache in accordance with an Integrated Circuits Cards Interface (CCID) protocol;
step P13-43 comprising determining data at first byte in the parsed result, executing step P13-44 in the case that the data at the first byte is a first preset character; executing step P13-45 in the case that the data at the first byte is a second preset character; executing step P13-46 in the case that the data at the first byte are other values;
step P13-44 comprising carrying out a corresponding process to the parsed result correspondingly, storing a processed result into the second cache, returning the processed result to the host, returning to step P13-42;
step P13-45 comprising sending application protocol data unit (APDU) data in the parsed result to a command layer to be processed, receiving a processed result and storing the processed result into the second cache, returning the processed result to the host, returning to step P13-42;
step P13-46 comprising organizing an information error response and storing the response into the second cache, returning the response to the host, returning to step P13-42;
step P13-47, waiting for an instruction sent by the host, when a Set up package of eight bytes is received via the USB interface, determining a state of a state machine, executing step P13-49 in the case that the state is sending; executing step P13-48 in the case that the state is receiving;
step P13-48 comprising parsing the Set up package in accordance with a Human Interface Device (HID) protocol, and detecting data at the first two bytes in the parsed result, executing step P13-51 in the case that the data at the first two bytes is a first character string; returning to step P13-47 in the case that the data at the first two bytes are other values;
step P13-49 comprising parsing the Set up package in accordance with the HID protocol, and detecting data at the first two bytes in the parsed result, executing step P13-51 in the case that the data at the first two bytes is the first character string; executing step P13-50 in the case that the data at the first two bytes is a second character string; returning to step P13-47 in the case that the data at the first two bytes are other values;
step P13-50 comprising returning response data in the second cache to the host, setting the state of the state machine as receiving, returning to step P13-47;
step P13-51 comprising storing the parsed result of the Set up package into the first cache, determining whether the instruction is a hot reset instruction in accordance with the parsed result, executing step P13-52 in the case that the instruction is a hot reset instruction; executing step P13-53 in the case that the instruction is not a hot reset instruction;
step P13-52 comprising setting the response data which comprises a reset parameter, and storing the response data into the second cache, setting the state of the state machine as sending, returning to step P13-47;
step P13-53 comprising sending the parsed result to the command layer to be processed, receiving the processed result and storing the processed result into the second cache, setting the state of the state machine as sending, returning to step P13-47;
step P13-54 comprising waiting for an instruction sent by the host, parsing the instruction in accordance with a Small Computer System Interface (SCSI protocol when the instruction is received via the USB interface;
step P13-55 comprising determining whether the received instruction is a valid SCSI instruction in accordance with the parsed result, executing step P13-56 in the case that the received instruction is a valid SCSI instruction; executing step P13-54 in the case that the received instruction is not a valid SCSI instruction;
step P13-56 comprising determining whether the received instruction is a standard SCSI instruction in accordance with the parsed result, executing step P13-57 in the case that the received instruction is a standard SCSI instruction; executing step P13-58 in the case that the received instruction is not a standard SCSI instruction;
step P13-57 comprising carrying out a corresponding process in accordance with the standard SCSI instruction, returning the processed result to the host, returning to step P13-54;
step P13-58 comprising determining the state of data transfer, executing step P13-59 in the case that the state is sending; executing step P13-60 in the case that the state is receiving;
step P13-59 comprising returning response data in the second cache to the host, returning to step P13-54;
step P13-60 comprising storing the parsed result into the first cache, determining whether the received instruction is a hot reset instruction according to the parsed result, executing step P13-61 in the case that the received instruction is a hot reset instruction; executing step P13-62 in the case that the received instruction is not a hot reset instruction;
step P13-61 comprising setting the response data which comprises a reset parameter, and storing the response data into the second cache, setting the state of data transfer as sending, returning to step P13-54;
step P13-62 comprising sending the parsed result to the command layer to be processed, receiving the processed result and storing the processed result into the second cache, returning to step P13-54.

14. A method for recognizing a communication mode, comprising:
step L1 comprising powering on a device, initializing, and turning on an interruption;
step L2 comprising determining whether a serial interruption is triggered, executing step L3 in the case that the serial interruption is triggered; entering other interruptions beginning at step D1 below in the case that the serial interruption is not triggered, continuing to execute step L3 after the interruption is exited;
step L3 comprising determining whether a communication mode is Universal Serial Bus (USB) interface communication, executing step L4 in the case that the communication mode is USB interface communication; executing step L5 in the case that the communication mode is not USB interface communication;

step L4 comprising receiving an instruction sent by a host, processing the received instruction according to a USB interface communication protocol supported by the device, subsequently, waiting for an instruction sent by the host, returning to step L4;

step L5 comprising determining whether the communication mode is first serial communication, executing step L6 in the case that the communication mode is the first serial communication;

executing step L7 in the case that the communication mode is not the first serial communication;

step L6 comprising waiting for an instruction sent by the host, carrying out a corresponding process in accordance with a serial port protocol when the instruction is received, returning to step L6 after the operation is finished;

step L7 comprising determining whether a serial port signal is detected or not, and waiting for a hand shake package sent by the host;

step L8 comprising executing step L9 in the case that the serial port signal is detected; returning to step L2 in the case that the serial port signal is not detected;

step L9 comprising receiving data at a first byte sent by the host, and storing the data at the first byte into a first cache, determining whether the data at the first byte is a first preset value, executing step L10 in the case that the data at the first byte is the first preset value; returning to step L2 in the case that the data at the first byte is not the first preset value;

step L10 comprising when all data sent by the host is received via a serial port, storing the data into the first cache, verifying the data stored in the first cache and determining whether the verifying is successful, executing step L11 in the case that the verifying is successful; returning to step L2 in the case that the verifying is not successful;

step L11 comprising setting a serial communication baud rate, setting the communication mode as a first serial communication, returning to step L2;

wherein entering other interruptions comprises:

step D1 comprising determining whether a USB interruption is triggered, executing step D2 in the case that the USB interruption is triggered; exiting the interruption in the case that the USB interruption is not triggered;

step D2 comprising turning off the USB interruption, determining whether a Set up package is received via an endpoint 0, executing step D3 in the case that the Set up package is received via the endpoint 0; turning on the USB interruption and executing step D4 in the case that the Set up package is not received via the endpoint 0;

step D3 comprising turning on the USB interruption, implementing a USB enumeration, returning the USB interface communication protocol supported by the device to the host, executing step D4;

step D4, setting the communication mode as the USB interface communication, exiting the USB interruption.

15. The method of claim 14, wherein, initializing comprises: setting a value of a communication identifier as 0;

determining whether the communication mode is USB interface communication comprises:

determining whether a value of a communication identifier is 1, the communication mode is the USB interface communication in the case that the value of the communication identifier is 1; the communication mode is not the USB interface communication in the case that the value of the communication identifier is not 1;

setting the communication mode as the first serial communication comprises: setting the value of the communication identifier as 4;

determining whether the communication mode is the first serial communication comprises:

determining whether the value of the communication identifier is 4, the communication mode is the first serial communication in the case that the value of the communication identifier is 4; the communication mode is not the first serial communication in the case that the value of the communication identifier is not 4.

16. The method of claim 14, wherein, step L6 comprises:

step L6-1 comprising receiving serial data and storing it into the first cache;

step L6-2 comprising extracting data at the first seven bytes from the serial data in the first cache, and determining whether data at a first byte and data at a second byte is a first preset character string, executing step L6-3 in the case that the data at the first byte and the data at the second byte is a first present character string; clearing the communication mode, returning error information to the host, and returning to step L2 in the case that the data at the first byte and the data at the second byte is not the first preset character string;

step L6-3 comprising detecting data at the lowest four bits of a fourth byte, executing step L6-4 in the case that the data at the lowest four bits of a fourth byte is a first set value; executing step L6-5 in the case that the data at the lowest four bits of a fourth byte is a second set value;

executing step L6-6 in the case that the data is a third value;

step L6-4 comprising returning shake hands information which comprises a serial communication baud rate to the host, returning to step L2;

step L6-5 comprising returning response data in a second cache to the host, returning to step L2;

step L6-6 comprising extracting application protocol data unit (APDU) data and a length of data from the first cache, calculating a length of the APDU data;

step L6-7 comprising determining whether the calculated length of the APDU data is the same as the length of the data extracted, returning a receiving correct data response to the host and executing step L6-8 in the case that the length of the APDU data is the same as the length of the data extracted; returning a receiving wrong information to the host in the case that the length of the APDU data is not the same as the length of the data extracted, returning to step L2;

step L6-8 comprising processing the APDU data according to a serial port protocol, and storing the processed result into the second cache, returning to step L2.

17. The method of claim 14, further comprising:

predefining, by the device, a USB interface communication protocol supported by the device, wherein the USB interface communication protocol supported by the device comprises an Integrated Circuits Cards Interface Device (CCID) protocol, a Human Interface Device (HID) protocol or a Small Computer System Interface (SCSI) protocol;

returning the USB interface communication protocol supported by the device to the host in step D3 comprises:

sending, by the device, a value of an input/output (IO) communication identifier to the host.

18. The method of claim 17, wherein,
in the case that the value of the IO communication identifier is the first preset value, step L4 comprises:
step L4-11 comprising waiting for an instruction sent by the host, when the instruction is received via the USB interface, storing the instruction into the first cache, parsing the instruction in the first cache in accordance with the CCID protocol;
step L4-12 comprising determining data at a first byte in the parsed result, executing step L4-13 in the case that the data at the first byte in the parsed result is a first preset character; executing step L4-14 in the case that the data at the first byte in the parsed result is a second preset character; executing step L4-15 in the case that the data are other values;
step L4-13 comprising carrying out a corresponding process to the parsed result, and storing a processed result into the second cache, returning the processed result to the host, returning to step L4-11;
step L4-14 comprising sending application protocol data unit (APDU) data in the parsed result to a command layer to be processed, storing a processed result into the second cache when the processed result is received, returning the processed result to the host, returning to step L4-11;
step L4-15 comprising organizing an information error response and storing the information error response into the second cache, returning the information error response to the host, returning to step L4-11;
or
in the case that the value of the IO communication identifier is a second preset value, step L4 comprises:
step L4-21 comprising waiting for an instruction sent by the host, determining a state of a state machine when a Set up package of eight bytes is received via the USB interface, executing step L4-23 in the case that the state of the state machine is sending; executing step L4-22 in the case that the state of the state machine is receiving;
step L4-22 comprising parsing the Set up package according to the HID protocol, and detecting data at the first two bytes in the parsed result, executing step L4-25 in the case that the data at the first two bytes of the parsed result is a first character string; returning to step L4-21 in the case that the data at the first two bytes are other values;
step L4-23 comprising parsing the Set up package according to the HID protocol, and detecting data at the first two bytes in the parsed result, executing step L4-25 in the case that the data at the first two bytes of the parsed result is the first character string; executing step L4-24 in the case that the data at the first two bytes of the parsed result is a second character string; returning to step L4-21 in the case that the data at the first two bytes are other values;
step L4-24 comprising returning response data in the second cache to the host, setting the state of the state machine as receiving, returning to step L4-21;
step L4-25 comprising storing the parsed result of the Set up package into the first cache, determining whether the instruction is a hot reset instruction according to the parsed result, executing step L4-26 in the case that the instruction is a hot reset instruction; executing step L4-27 in the case that the instruction is not a hot reset instruction;
step L4-26 comprising setting response data which comprises a reset parameter, storing the response data into the second cache, setting the state of the state machine as sending, returning to step L4-21;
step L4-27 comprising sending the parsed result to the command layer to be processed, receiving a processed result and storing the processed result into the second cache, setting the state of the state machine as sending, returning to step L4-21;
or
in the case that the value of the IO communication identifier is a third preset value, step L4 comprises:
step L4-31 comprising waiting for an instruction sent by the host, parsing the instruction according to the SCSI protocol when the instruction is received via the USB interface;
step L4-32 comprising determining whether the received instruction is a valid SCSI instruction, executing step L4-33 in the case that the received instruction is a valid SCSI instruction;
returning to step L4-31 in the case that the received instruction is not a valid SCSI instruction;
step L4-33 comprising determining whether the received instruction is a standard SCSI instruction according to the parsed result, executing step L4-34 in the case that the received instruction is a standard SCSI instruction; executing step L4-35 in the case that the received instruction is not a standard SCSI instruction;
step L4-34 comprising carrying out a corresponding process in accordance with the standard SCSI instruction, returning a processed result to the host, returning to step L4-31;
step L4-35 comprising determining a state of data transfer, executing step L4-36 in the case that the state of data transfer is sending; executing step L4-37 in the case that the state of data transfer is receiving;
step L4-36 comprising returning response data into the second cache to the host, returning to step L4-31;
step L4-37 comprising storing the parsed result into the first cache, determining whether the received instruction is a hot reset instruction according to the parsed result, executing step L4-38 in the case that the received instruction is a hot reset instruction; executing step L4-39 in the case that the received instruction is not a hot reset instruction;
step L4-38 comprising setting the response data which comprises a reset parameter, and storing the response data into the second cache, setting the state of data transfer as sending, returning to step L4-31;
step L4-39 comprising sending the parsed result to the command layer to be processed, receiving the processed result and storing the processed result into the second cache, returning to step 4A-31.

19. The method of claim 14, wherein, the method further comprises: predefining, by the device, that the USB interface communication protocol supported by the device comprises at least two protocols of an Integrated Circuits Cards Interface Device (CCID) protocol, a Human Interface Device (HID) protocol and a Small Computer System Interface (SCSI) protocol;
returning the USB interface communication protocol supported by the device to the host in step B5, comprising: sending, by the device, an input/output (IO) communication identifier to the host.

20. The method of claim 19, wherein, step L4 comprises:
step L4-41 comprising detecting a value of the IO communication identifier, executing step L4-42 in the case that the value of the IO communication identifier is a first preset value; executing step L4-47 in the case that the value of the IO communication identifier is a second preset value;

executing step L4-54 in the case that the value of the IO communication identifier is a third preset value;

step L4-42 comprising waiting for an instruction sent by the host, storing the instruction into the first cache when the instruction is received via the USB interface, parsing the instruction in the first cache in accordance with the CCID protocol;

step L4-43 comprising determining data at the first byte in a parsed result, executing step L4-44 in the case that the data at the first byte in the parsed result is a first preset character; executing step L4-45 in the case that the data at the first byte in the parsed result is a second preset character; executing step L4-46 in the case that the data at the first byte in the parsed result are other values;

step L4-44 comprising carrying out a corresponding process on the parsed result, storing a processed result into a second cache, returning the processed result to the host, returning to step L4-42;

step L4-45 comprising sending the application protocol data unit (APDU) data in the parsed result to a command layer to be processed storing the parsed result into the second cache when a processed result is received, returning the processed result to the host, returning to step L4-42;

step L4-46 comprising organizing the information error response and storing the information error response into the second cache, returning the information error response to the host, returning to step L4-42;

step L4-47 comprising waiting for an instruction sent by the host, determining a state of a state machine when the Set up package of eight bytes is received via the USB interface, executing step L4-49 in the case that the state of the state machine is sending; executing step L4-48 in the case that the state of the state machine is receiving;

step L4-48 comprising parsing the Set up package according to the HID protocol, detecting the data at the first two bytes in the parsed result, executing step L4-51 in the case that the data at the first two bytes is a first character string; returning to step L4-47 in the case that the data at the first bytes in the parsed result are other values;

step L4-49 comprising parsing the Set up package in accordance with the HID protocol, and detecting data at the first two bytes in the parsed result, executing step L4-51 in the case that the data at the first two bytes is the first character string; executing step L4-50 in the case that the data at the first two bytes is a second character string; returning to step L4-47 in the case that the data are other values;

step L4-50 comprising returning response data in the second cache to the host, setting the state of the state machine as receiving, returning to step L4-47;

step L4-51 comprising storing the parsed result of the Set up package into the first cache, determining whether the instruction is a hot reset instruction according to the parsed result, executing step L4-52 in the case that the instruction is a hot reset instruction; executing step L4-53 in the case that the instruction is not a hot reset instruction;

step L4-52 comprising setting a response data which comprises a reset parameter, and storing the response data into the second cache, setting the state of the state machine as sending, returning to step L4-47;

step L4-53 comprising sending the parsed result to a command layer to be processed, receiving a processed result and storing the processed result into the second cache, setting the state of the state machine as sending, returning to step L4-47;

step L4-54 comprising waiting for an instruction sent by the host, parsing the instruction in accordance with the SCSI protocol when the instruction is received via the USB interface;

step L4-55 comprising determining whether the received instruction is a valid SCSI instruction in accordance with the parsed result, executing step L4-56 in the case that the received instruction is a valid SCSI instruction; returning to step L4-54 in the case that the received instruction is not a valid SCSI instruction;

step L4-56 comprising determining whether the received instruction is a standard SCSI instruction according to the parsed result, executing step L4-57 in the case that the received instruction is a standard SCSI instruction; executing step L4-58 in the case that the received instruction is not a standard SCSI instruction;

step L4-57 comprising carrying out a corresponding process in accordance with the standard SCSI instruction, and returning a processed result to the host, returning to step L4-54;

step L4-58 comprising determining the state of data transfer, executing step L4-S9 in the case that the state is sending; executing step L4-60 in the case that the state is receiving;

step L4-59 comprising returning response data in the second cache to the host, returning to step L4-54;

step L4-60 comprising storing the parsed result into the first cache, determining whether the received instruction is a reset instruction in accordance with the parsed result, executing step L4-61 in the case that the received instruction is a hot reset instruction; executing step L4-62 in the case that the received instruction is not a hot reset instruction;

step L4-61 comprising setting the response data which comprises a reset parameter, and storing the response data into the second cache, setting the state of data transfer as sending, returning to step L4-54;

step L4-62 comprising sending the parsed result to the command layer to be processed, receiving a processed result and storing the processed result into the second cache, returning to step L4-54.

\* \* \* \* \*